United States Patent
Nakagawa et al.

(10) Patent No.: US 7,141,305 B2
(45) Date of Patent: Nov. 28, 2006

(54) WATER-REPELLENT FILM AND METHOD FOR PRODUCING THE SAME, AND INK JET HEAD AND INK JET TYPE RECORDING APPARATUS USING THE SAME

(75) Inventors: Tohru Nakagawa, Kusatsu (JP); Tatsuya Hiwatashi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 389 days.

(21) Appl. No.: 10/469,144

(22) PCT Filed: Apr. 1, 2002

(86) PCT No.: PCT/JP02/03247

§ 371 (c)(1),
(2), (4) Date: Aug. 26, 2003

(87) PCT Pub. No.: WO02/081588

PCT Pub. Date: Oct. 17, 2002

(65) Prior Publication Data

US 2004/0125169 A1    Jul. 1, 2004

(30) Foreign Application Priority Data

Apr. 2, 2001    (JP) .............................. 2001-103710
Apr. 3, 2001    (JP) .............................. 2001-104605
Dec. 18, 2001    (JP) .............................. 2001-385068

(51) Int. Cl.
    C09D 183/08    (2006.01)
(52) U.S. Cl. .......................... 428/447; 528/35; 528/42; 106/287.16; 106/287.13
(58) Field of Classification Search ................ 528/35, 528/42; 106/287.16, 287.13; 428/447
    See application file for complete search history.

(56) References Cited

U.S. PATENT DOCUMENTS

| | | | |
|---|---|---|---|
| 5,266,222 A * | 11/1993 | Willis et al. ................ 508/206 |
| 5,266,358 A | 11/1993 | Uemura et al. |
| 5,328,768 A | 7/1994 | Goodwin |
| 5,372,888 A | 12/1994 | Ogawa et al. |
| 5,424,130 A | 6/1995 | Nakanishi et al. |
| 5,750,197 A | 5/1998 | van Ooij et al. |
| 6,528,585 B1 * | 3/2003 | Standke et al. ............. 525/102 |
| 6,696,538 B1 * | 2/2004 | Ko et al. ...................... 528/34 |
| 6,797,796 B1 * | 9/2004 | Singh et al. .................. 528/35 |
| 6,855,375 B1 * | 2/2005 | Nakagawa et al. ......... 427/387 |

FOREIGN PATENT DOCUMENTS

| | | |
|---|---|---|
| DE | 198 48 351 A1 * | 10/1998 |
| EP | 0 255 227 A | 2/1988 |
| EP | 0 841 099 A | 5/1998 |
| JP | 2-248480 | 10/1990 |
| JP | 5-112757 | 5/1993 |
| JP | 5-124818 | 5/1993 |
| JP | 5-171111 | 7/1993 |
| JP | 6-143586 | 5/1994 |
| JP | 6-171094 | 6/1994 |
| JP | 2500816 | 3/1996 |
| JP | 2525536 | 5/1996 |
| JP | 2555797 | 9/1996 |
| JP | 10-323979 | 12/1998 |
| JP | 2874391 | 1/1999 |
| JP | 11-227213 | 8/1999 |
| JP | 11-277749 | 10/1999 |
| JP | 11-279540 | 10/1999 |

OTHER PUBLICATIONS

Abstract DE 1 0253 839, May 27, 2004.*

* cited by examiner

*Primary Examiner*—Margaret G. Moore
(74) *Attorney, Agent, or Firm*—Hamre, Schumann, Mueller & Larson, P.C.

(57) ABSTRACT

A water-repellent film that is formed on a solid substrate includes: a molecule (A) including at least one or more of siloxane bonding (—Si—O—) at both ends and a hydrocarbon chain in a middle part; and a molecule (B) including a fluorocarbon chain at one end and at least one or more of siloxane bonding (—Si—O—) at another end, wherein a polymer film is formed at least with the molecule (A) and the molecule (B). This polymer film forms a covalent bond with a surface of the substrate via siloxane bonding (—Si—O—), and the surface thereof is covered with fluorocarbon chains having high water repellency. Therefore, this film prevents the intrusion of alkali ions. Thereby, an ink jet head and an ink jet type apparatus having a water-repellent film that is not destroyed by the long-term contact with alkaline ink can be provided.

7 Claims, 13 Drawing Sheets

WATER-REPELLENT FILM AND METHOD FOR PRODUCING THE SAME, AND INK JET HEAD AND INK JET TYPE RECORDING APPARATUS USING THE SAME

TECHNICAL FIELD

The present invention relates to a water-repellent film having high alkali resistance and a method for producing the same. The present invention also relates to an ink jet head and an ink jet type recording apparatus using the water-repellent film.

BACKGROUND ART

A water-repellent film, which can repel water and oil and allow easy removal of materials attached to the surface thereof, has been used widely in various fields. For example, by forming a water-repellent film on windows of an automobile, it is possible to secure an excellent view because the windows can repel water even on rainy days.

Furthermore, by forming a water-repellent film on such places as the surface of cooking equipment, kitchen, bathroom, and the like, dirt can be removed easily from such places, and consequently, the care thereof becomes easy. Furthermore, in recent years, such a water-repellent film has been used as a main component of an ink jet nozzle making up an ink jet head of an ink jet type recording apparatus. The reason why the ink jet nozzle requires a water-repellent film will be described below in detail.

The mechanism of printing by the ink jet type recording apparatus is to discharge several tens pico-liter of ink from each of a large number of nozzle holes with a diameter of several tens μm, which are bored in a nozzle plate, onto a printed medium such as paper so as to arrange the discharged ink at a predetermined position on the printed medium. In order to arrange the ink at a predetermined position on the printed medium, the ink is discharged while mechanically moving the nozzle plate and the printed medium respectively to control their relative position. FIG. 8A is a cross-sectional view showing a nozzle hole 34 and its vicinity, where an ink space 31 for storing a fixed amount of ink 32 is formed on an inner surface of a nozzle plate 33 having a through hole from which the ink 32 is discharged. As shown in FIG. 8B, the ink space 31 is designed so that the pressure in the space can be increased as needed, for example, by means of mechanical deformation of a piezoelectric thin film 35. By increasing the pressure in the ink space 31, a predetermined amount of ink 36 can be discharged through the through hole of the nozzle plate from the ink space as indicated by an arrow 37. Here, in order to conduct high-definition printing, the ink discharged from the through hole should be arranged on the printed medium accurately. To this end, it is necessary to control precisely the relative position of the nozzle and the printed medium, to control the amount of discharged ink and make the same minute, and to control precisely the discharging direction of the ink. Among these, in order to control precisely the discharging direction of the ink, the discharging direction of the ink should be perpendicular to the nozzle plate face. Here, as shown in FIG. 9A, if ink 45 remains at a portion of the periphery of the hole, the discharging direction of ink 47 will lean toward the remaining ink side and deviate from the perpendicular direction as shown by an arrow 48 of FIG. 9B. Because the attractive force occurs due to the surface tension between the ink 47 and the remaining ink 45, the ink 47 from the nozzle 34 is attracted toward the side of the ink 45. To avoid this situation, in normal printers, remaining ink is removed by wiping the periphery of holes regularly with a rubber blade. Here, in order to clearly remove the remaining ink by wiping it with the rubber blade, it has been found that an ink-discharging plane of a nozzle plate should have water repellency. For that reason, on a surface of an ink jet nozzle plate, various water-repellent films are formed.

Conventionally, in order to form a water-repellent film on a solid substrate, in general, polytetrafluoroethylene (PTFE) and the derivatives thereof, which have water repellency, have been applied to the substrate to form a film. However, PTFE and the derivatives thereof have a small surface energy and even if they are applied directly to the substrate to form a film, the film peels off the substrate easily. Therefore, in order to secure the adhesion between the film and the substrate, there have been employed a method of roughening the surface of the substrate and then applying a water-repellent film to the roughened surface, and a method of roughening the surface of the substrate, and forming a primer layer (adhesive layer) made of polyethylene sulphide, etc., on the roughened surface, followed by sintering a water-repellent film. Furthermore, when the solid substrate is made of a metal, a method of plating particles of PTFE and the derivatives thereof together with the metal may be employed.

On the other hand, there have been proposed methods of forming a water-repellent film having an excellent adhesion directly on the surface of a substrate by using a silane coupling agent without roughening the surface of the substrate. As the first example of these methods, there is described a method for forming a water-repellent monomolecular or polymer film by allowing fluoroalkyl trichlorosilane such as $CF_3(CF_2)_8C_2H_4SiCl_3$ to react with a substrate (JP 2500816 and JP 2525536). In the above-mentioned chemical formula, $CF_3(CF_2)_8C_2H_4$— represents a fluoroalkyl group, and —$SiCl_3$ represents a trichlorosilyl group. In this method, a substrate having active hydrogen on the surface thereof is brought into contact with a solution in which fluoroalkyl trichlorosilane is dissolved so as to allow a chlorosilyl group (—SiCl) to react with active hydrogen, thus forming —Si—O— bonding to the substrate. As a result, a fluoroalkyl chain is fixed to the substrate via —Si—O—. Herein, the fluoroalkyl chain provides a film with water repellency. Depending on the film formation conditions, the water-repellent film becomes a monomolecular film or a polymeric film. As the second example, there is described a method in which a porous substrate impregnated with a compound containing fluorine such as fluoroalkyl alkoxysilane is heated in a vacuum to evaporate the compound, thus providing the surface of the substrate with water repellency (JP 6 (1994)-143586A). In order to improve the adhesion between the water-repellent film and the substrate, this method proposes that an intermediate layer made of silicon dioxide, etc. is provided. As the third example, there is described a method of forming a film made of titanium, titanium oxide or indium-tin oxide on the substrate, and forming a fluoroalkyl silane based compound thereon by a vacuum evaporation method (JP 10 (1998)-323979A). As the fourth example, there is described a method of forming fine particles of oxides such as zirconia and alumina on the surface of a substrate, and then applying a fluorine based silane coupling agent such as fluoroalkyl chlorosilane and fluoroalkyl alkoxysilane (JP 6 (1994)-171094A). As the fifth example, there is described a method of subjecting a mixed solution, which is obtained by adding metal alkoxide to fluoroalkylalkoxysilane such as $CF_3(CF_2)_8C_2H_4Si(OCH_3)_3$, to hydrolysis and dehydration polymerization, and then applying the solution to the substrate, followed by baking, thereby forming a water-repellent film in which molecules having a fluoroalkyl chain are mixed in the metal oxide (JP 2687060, JP 2874391, JP 2729714 and JP 2555797). In these methods, a fluoroalkyl chain provides the film with water repellency, and a metal oxide provides the film with a high mechanical strength.

The water repellent film has to be produced by selecting an optimum method among various formation methods as described above depending on its intended use. For the formation of a water-repellent film used for an ink jet nozzle, especially, a method utilizing a silane coupling agent is more effective than the other methods because of the following respects. Firstly, a water-repellent treatment can be conducted basically on any substrate of a nozzle. Secondly, a water-repellent film can be made thin. The reason for requiring the thin film is, as shown in FIG. 10A, that side faces of a nozzle through hole 34 that is bored in a water-repellent film 55 should have water repellency and have a small film thickness. A large film thickness of a water-repellent film 56 as shown in FIG. 10B makes it impossible for ink 32 to be discharged from an ink space 31 through a through hole 34 due to the water repellency of the side faces thereof. To avoid this situation, the film thickness should be made sufficiently smaller than a nozzle diameter. For this reason, it can be considered that the second feature will increasingly become important. This is because the tendency for requiring high-definition printing will be increased in the future, and accordingly a nozzle diameter will be reduced, and therefore a water-repellent film with a film thickness smaller than such a nozzle diameter will be demanded. Therefore, the above-mentioned second to fourth methods are employed for forming a water-repellent film used for an ink jet nozzle.

Since a water-repellent film using a silane coupling agent can be formed on various substrates without performing a pretreatment, it can be expected to be applied in various fields. It is particularly useful in an ink jet head application. However, a conventional water-repellent film using a silane coupling agent lacks durability against alkalinity. Especially, in the application to an ink jet head, this is a serious problem. This is because the ink used for an ink jet type recording apparatus generally is alkaline, and therefore a water repellent-film used for the ink jet head is required to have durability against an alkaline solution.

The conventional monomolecular film or polymer film using a silane coupling agent is bonded to the substrate via Si—O bonding. However, since this bonding is hydrolyzed easily in an alkaline solution, when the conventional water-repellent film is soaked in an alkaline solution, the bonding disappears easily from the substrate. That is, such a film lacks durability against an alkaline solution.

Then, the third and fourth examples provide a method in which in order to improve the alkali resistance, an alkali resistant lower film made of titanium oxide, titanium, zirconia particles, alumina particles, etc. is formed under a water-repellent film. Thus, a water-repellent film hardly is peeled off the solid substrate due to the lower layer breaking away. On the other hand, even with this configuration, the problem that hydrogen bonding or siloxane bonding between the water-repellent film and the substrate is broken by alkaline has not been solved completely.

The water-repellent films proposed in the conventional methods use a silane coupling agent having a reactive group only at one end of a straight-chain molecule, for example, fluoroalkyl alkoxysilane and fluoroalkyl chlorosilane, etc. In such a coupling agent, as shown in FIG. 11, due to the steric hindrance between molecules, three-dimensional polymerization between molecules hardly occurs and the film density is lower than that of a general polymeric polymer. A silane coupling agent 61 causes a hydration reaction 62 with a hydroxyl group on the surface of the substrate to form siloxane bonding, or is fixed by hydrogen bonding. Therefore, as shown in FIG. 12A, as the substrate 71 has the higher density of hydroxyl groups on the surface of the substrate, the density of the film (a film of the silane coupling agent bonded to the substrate) 72 in the vicinity of the substrate becomes higher. Herein, as shown in FIG. 12B, in the case of a lower film 73 made of titanium oxide, titanium, zirconia, etc., since the density of hydroxyl groups on the surface of such a film is low, the density of the water-repellent film (a film of the silane coupling agent bonded to the substrate) 74 that is in contact with the lower film is low. FIG. 13 is a schematic view showing a state in which water-repellent films 82 and 81 formed on a lower layer 83 having a low density of hydroxyl groups are exposed to an alkaline component. In the nearer part of the lower film 83, the silane coupling molecules (a water-repellent film in the vicinity of the lower film) 82 are fixed to the lower film 83 via hydrogen bonding and siloxane bonding, and in the more distant part from the lower film 83, the low density water-repellent film (a water-repellent film distant from the lower film) 81 is formed. When an alkali ink is brought into contact with this film, hydroxyl ions (OH⁻) 84 as alkaline components pass through the film 81 and go to the lower film 83. When the density of the water-repellent film 82 in the vicinity of the lower film is small, ions 85 enter into the interface between the film 82 and the lower film 83 and break the hydrogen bonding and the siloxane bonding present therein. Even if the lower film has much durability against an alkaline solution, if the density of hydroxyl groups on the surface thereof is low, the alkali resistance of the water-repellent film decreases.

Furthermore, in order to improve the alkali resistance, the fifth example is useful, in which a molecule having a fluoroalkyl chain is mixed in the metal oxide such as titanium oxide and zirconium oxide, which has the durability against an alkaline solution. However, these metal oxides have to be produced by subjecting titanalkoxide and zirconiumalkoxide to hydrolysis and dehydration polymerization, and these alkoxides have high reactivity and hydrolysis proceeds quickly in the air. Therefore, it is hard to handle a coating solution using these alkoxides for applying a water-repellent film. Therefore, siliconalkoxide that is stable in the air has been used widely. However, silicon oxide formed from the siliconalkoxide is solved in an alkaline solution. Therefore, there is a problem that the water-repellent film using siliconalkoxide has low durability against an alkaline solution.

DISCLOSURE OF THE INVENTION

In order to cope with the above-stated problems, an object of the present invention is to provide a water-repellent film having alkali resistance and a method for producing the same. Furthermore, another object of the present invention is to provide, by applying this water-repellent film, an ink jet head and an ink jet type apparatus including an ink jet nozzle provided with a water-repellent film that is not broken after the long time contact with an alkaline ink.

To fulfill the above-stated object, a first water-repellent film of the present invention that is formed on a solid substrate includes: a molecule (A) including at least one or more of siloxane bonding (—Si—O—) at both ends and a hydrocarbon chain in a middle part; and a molecule (B) including a fluorocarbon chain at one end and at least one or more of siloxane bonding (—Si—O—) at another end, wherein a polymer film is formed at least with the molecule (A) and the molecule (B).

A second water-repellent film of the present invention is formed on a solid substrate and is made up of a two-layered thin film. In the water-repellent film, a first-layer film contacting with the substrate is made of a mixture of a silicon oxide and a titanium oxide, a ratio of the silicon to the titanium being in the range from 10% to 30%, inclusive, in terms of mols, and a second-layer film formed on the first-layer film is a polymer film that is at least one selected from a hydrolyzate and a dehydrated polymer of a silane coupling agent comprising a fluorocarbon chain.

Next, a first method for producing a water-repellent film on a solid substrate of the present invention includes the steps of: applying a coating solution to the substrate, wherein the coating solution is prepared by mixing a silane coupling agent (A) including reactive functional groups at both ends and comprising a hydrocarbon chain in a middle part, a silane coupling agent (B) including a fluorocarbon chain at one end and a reactive functional group at another end, an organic solvent, water and an acidic catalyst, and heating the substrate so as to form a polymer film with the silane coupling agent (A) and the silane coupling agent (B).

A second method for producing a water-repellent film on a solid substrate includes the steps of: applying a first coating solution to the substrate, followed by baking at 300° C. or higher, where the first coating solution is prepared by mixing titanalkoxide, siliconalkoxide, an organic solvent, water and an acidic catalyst, and applying a second coating solution to the substrate, followed by baking, where the second coating solution is prepared by mixing a silane coupling agent having a fluorocarbon chain, an organic solvent, water and an acidic catalyst. In the first coating solution, a ratio of the siliconalkoxide to the titanalkoxide is in the range from 10% to 30%, inclusive, in terms of mols.

Next, an ink jet nozzle of the present invention includes a substrate having a nozzle hole from which ink is discharged and a water-repellent film that is formed on an ink-discharging side of the substrate. Here, the water-repellent film is the water-repellent film according to any one of the first to second water-repellent films of the present invention.

Next, an ink jet type recording apparatus of the present invention includes the ink jet head according to any one of the above-described ink jet heads and a moving unit for relative movement of a recording medium.

BEST MODE FOR CARRYING OUT THE INVENTION

Figure 1:
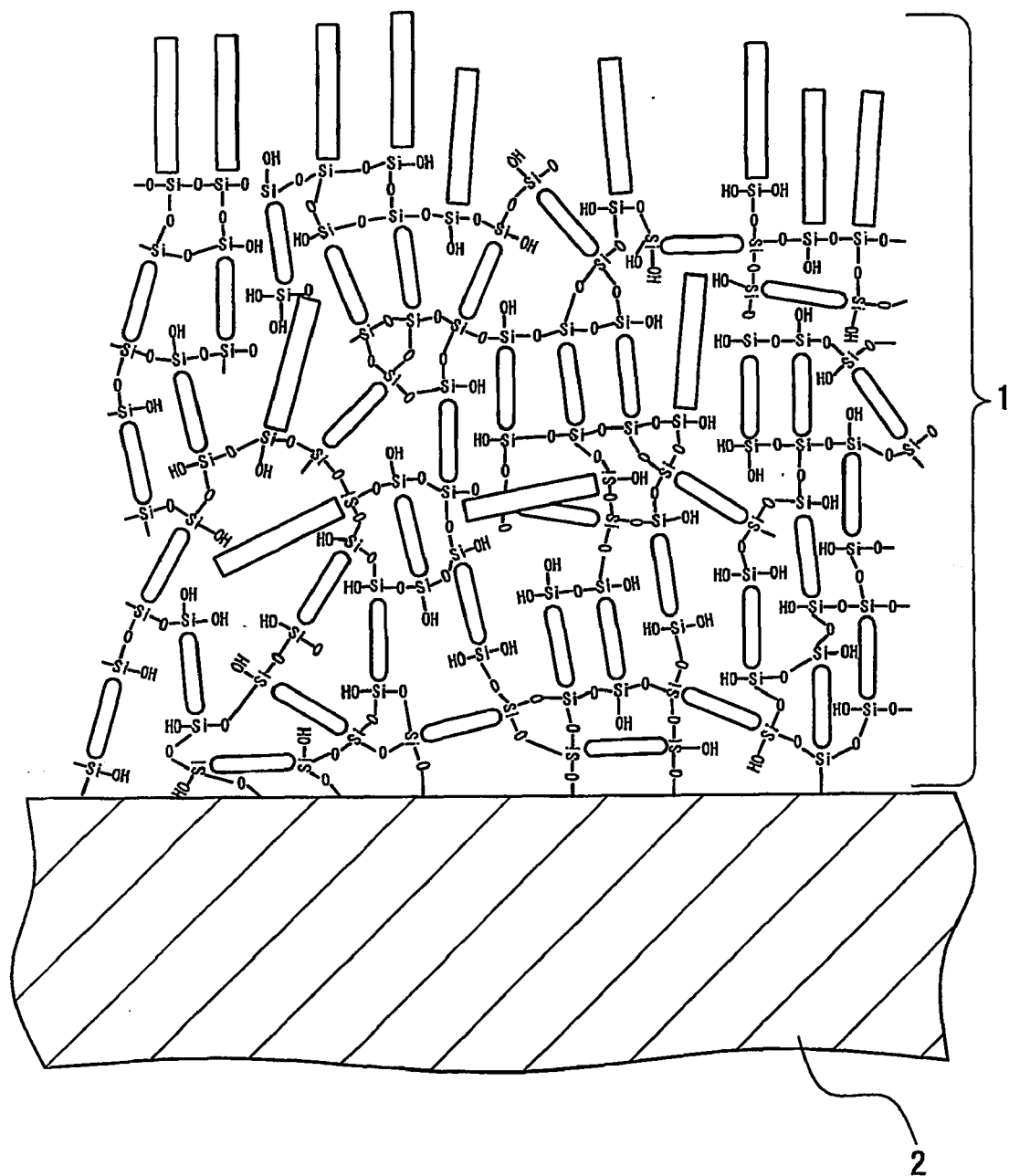
FIG. 1 is a schematic view showing a configuration of a water-repellent film according to Embodiment 1 of the present invention.
Figure 1:
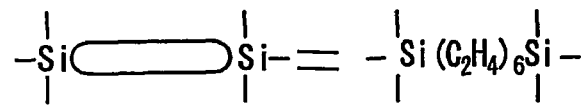
Figure 1:
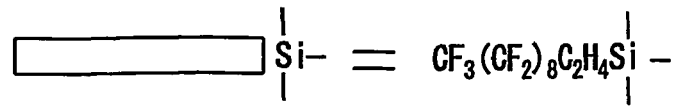

In the water-repellent film of the present invention, between the solid substrate and the water-repellent film, a first lower polymer film further may be formed, the first lower polymer film being configured with a molecule including at least one or more of siloxane bonding (—Si—O—) at both ends and a fluorocarbon chain in a middle part.

In addition, between the solid substrate and the first lower polymer film, a second lower oxide film may be formed, the second lower oxide film being made of a mixture of a silicon oxide and a titanium oxide.

In addition, it is preferable that a density of the molecule (B) in the vicinity of the outermost surface of the water-repellent film is higher than a density of the molecule (B) inside the water-repellent film.

In addition, in the water-repellent film of the present invention, it is preferable that a ratio of the molecule (A) and the molecule (B) is in the range from 0.001 to 0.2 (=the molecule (B)/the molecule (A)) that is represented by a mol ratio.

In addition, in the water-repellent film of the present invention, the molecule (A) may include a straight-chain hydrocarbon chain. Alternatively, in the water-repellent film of the present invention, the molecule (A) may include a benzene ring.

Next, in the method of the present invention, between the solid substrate and the water-repellent film, a polymer film further may be formed by applying a first underlayer coating solution to the substrate, wherein the first underlayer coating solution is prepared by mixing a silane coupling agent including reactive functional groups at both ends and including a fluorocarbon chain in a middle part, an organic solvent, water and an acidic catalyst.

It is preferable that after the first underlayer coating solution is applied to the solid substrate, followed by heating at 100° C. to 300° C., inclusive, then a coating solution including the silane coupling agent (A) and the silane coupling agent (B) is applied thereto.

Between the solid substrate and the first underlayer polymer film, an oxide film that is made of a silicon oxide and a titanium oxide further may be formed by applying a second underlayer coating solution to the substrate, followed by baking, wherein the second underlayer coating is prepared by mixing titanalkoxide, siliconalkoxide, an organic solvent, water and an acidic catalyst.

In addition, in the method of the present invention, when the molecule (A) includes a hydrocarbon chain, it is preferable that the number of carbons that constitute the straight-chain hydrocarbon chain ranges from 1 to 10, inclusive. In the present invention, it is preferable that the molecule (A) includes a benzene ring and a mol ratio of water/the molecule (A)=20 to 150 is satisfied. In the method of the present invention, it is preferable that a mol ratio of the molecule (A) and the molecule (B) is in the range from 0.001 to 0.2 (=the molecule (B)/the molecule (A)).

In the method of the present invention, it is preferable that the organic solvent of the coating solution including the silane coupling agent (B) includes alcohol having fluorocarbon.

In addition, in the method of the present invention, it is preferable that a dew point of the atmosphere for applying the coating solution to the substrate is lower than a temperature of the atmosphere by 5° C. or more.

In addition, in the method of the present invention, it is preferable that when the molecule (A) includes a straight-chain hydrocarbon chain, it is preferable that the number of carbons that constitute the straight-chain hydrocarbon chain ranges from 1 to 10, inclusive.

In addition, in the method of the present invention, it is preferable that a method for applying the coating solution to a surface of the substrate is at least one selected from a dipping method, a spraying method, a brushing method, a method using a cloth, a spin coating method, a method using a roller, a knife coating method and a film coating method.

As a result of various analyses and experiments by the present inventors as to an influence of an alkaline solution on a water-repellent film and its mechanism, the present inventors have found a method for realizing a water-repellent film having high alkali resistance using a silane coupling agent. In addition, an ink jet head and an ink jet type recording apparatus can be realized by applying this water-repellent film.

The following describes embodiments of the present invention for the sake of clarity of the present invention. However, the present invention is not limited only to the following embodiments.

[Embodiment 1]

According to the first embodiment of the present invention, a film includes a molecule (A) having at least one or more of siloxane bonding (—Si—O—) at both ends and a hydrocarbon chain (—$(CH_2)_n$—; n is a natural number) in the middle part and a molecule (B) having a fluorocarbon chain (—$(CF_2)_n$—; n is a natural number) at one end and at least one or more of siloxane bonding (—Si—O—) at another end, where a polymer is formed with the molecule (A) and the molecule (B). The fluorocarbon chain of the molecule (B) provides the film with water repellency, because it is a nonpolar molecule. Then, the molecule (A) forms a high-density polymer film by the siloxane bonding at the both ends of the molecule, and the molecule (B) is bonded to this polymer film via the siloxane bonding.

As one example of the molecule (A), —$OSi(R^1R^2)(CH_2)_n Si(R^1R^2)O$— ($R^1$ and $R^2$ are a methyl group, an ethyl group, a methoxy group (—$OCH_3$), an ethoxy group (—$OC_2H_5$), a hydroxyl group (—OH), or oxygen constituting siloxane bonding, and n is a natural number from 1 to 10) is included. As the molecule (B), $CF_3(CF_2)_nC_2H_4Si(R^1R^2)O$— ($R^1$ and $R^2$ are a methyl group, an ethyl group, a methoxy group (—$OCH_3$), an ethoxy group (—$OC_2H_5$), a hydroxyl group (—OH), or oxygen constituting siloxane bonding, and n is a natural number from 1 to 12) is included. Herein, in order to provide the film with high water repellency, in the molecule (B), n=6 to 10 is preferable.

FIG. 1 is a schematic view showing a configuration of a water-repellent film 1 as one example of the present invention. In this example, the molecule (A) is (—O—)$_3$Si(CH$_2$)$_6$Si(—O—)$_3$ and the molecule (B) is CF$_3$(CF$_2$)$_7$C$_2$H$_4$Si(—O—)$_3$. In this configuration, the density of the molecule (B) is high in the vicinity of a surface of the water-repellent film. Therefore, even when a ratio of the molecule (B) to the molecule (A) is low, a film with high water repellency can be obtained. As the ratio of the molecule (B) decreases, the film density of the water-repellent film is improved. Therefore, the water-repellent film of the present invention has excellent wear resistance. In FIG. 1, as a substrate 2, metal, ceramics and the like can be used.

In this film, siloxane bonding (—Si—O—) is present. Generally, the siloxane bonding is hydrolyzed in an alkaline solution and is disconnected. However, the present inventors have found that in the configuration of the water-repellent film of the present invention, the water-repellent hydrocarbon chain and fluorocarbon chain are present in the vicinity of the siloxane bonding and these molecule chains prevent an alkaline solution from intruding into the film. The present inventors have found that, as a result of this, the water-repellent film is not broken even in the presence of alkaline agents.

As the number of carbons constituting straight-chain hydrocarbon chain of the molecule (A) increases, the chain increasingly prevents the alkaline component from intruding into the siloxane bonding, but conversely, the density of the film decreases, thus decreasing the wear resistance of the film. The present inventors have found that, when the number of carbons constituting the straight-chain hydrocarbon chain of the molecule (A) ranges from 1 to 10, a film with excellent alkali resistance and excellent wear resistance can be realized.

As the ratio of the molecule (B) increases, the water repellency of the film is improved, but the wear resistance thereof decreases. Conversely, as the ratio of the molecule (B) decreases, the wear resistance of the film is improved but the water repellency thereof decreases. The present inventors have found that when the mol ratio of the molecule (B)/the molecule (A)=0.001 to 0.2 is satisfied, a film with excellent water repellency and excellent wear resistance can be realized.

When the molecule (A) includes a benzene ring, heat resistance of the water-repellent film is improved because the benzene ring has high heat resistance. That is, when the middle part of the molecule (A) includes only the straight-chain hydrocarbon chain, the water-repellent coating film exhibits heat-resistance of about 250° C., whereas the water-repellent coating film including a benzene ring exhibits heat-resistance of 300° C. or higher. Furthermore, the molecule including a benzene ring is stiffer than a molecule that does not include a benzene ring (the flexibility permissible for the molecular structure is reduced), and therefore this molecule is packed densely and the film density is increased, thus improving the wear resistance.

As the molecule (A) having a benzene ring, —OSi($R^1R^2$)($CH_2$)$_t$$C_6H_4$($CH_2$)$_u$Si($R^3R^4$)O— ($R^1$, $R^2$, $R^3$ and $R^4$ are a methyl group, an ethyl group, a methoxy group (—$OCH_3$), an ethoxy group (—$OC_2H_5$), a hydroxyl group (—OH), or oxygen constituting siloxane bonding, and t and u are a natural number from 1 to 10) is included. Herein, in order to improve the heat resistance of the produced film, it is preferable that the length of the straight-chain hydrocarbon chain is made as small as possible and t and u range from 1 to 3.

[Embodiment 2]

The second embodiment of the present invention is configured with a two-layered thin film. That is, a first-layer film is a polymer that is made up of a molecule having at least one or more of siloxane bonding (—Si—O—) at both ends and a fluorocarbon chain in the middle part, and a second-layer film formed on the first-layer film includes a molecule (A) having at least one or more of siloxane bonding (—Si—O—) at both ends and a hydrocarbon chain in the middle part and a molecule (B) having a fluorocarbon chain at one end and at least one or more of siloxane bonding (—Si—O—) at another end, where a polymer is formed with the molecule (A) and the molecule (B). Herein, the configuration of the second-layer film is basically the same as that of the film used in Embodiment 1.

As the molecule having a fluorocarbon chain in the middle part, —OSi($R^1R^2$)$C_2H_4$($CF_2$)$_n$ $C_2H_4$Si($R^3R^4$)O— ($R^1$, $R^2$, $R^3$ and $R^4$ are a methyl group, an ethyl group, a methoxy group (—$OCH_3$), an ethoxy group (—$OC_2H_5$), a hydroxyl group (—OH), or oxygen constituting siloxane bonding, and n is a natural number from 1 to 12) is included. In the first-layer polymer made up of this molecule, siloxane bonding is included. However, the water-repellent fluorocarbon chain in the vicinity of this bonding prevents an alkaline solution from intruding into the film, thus preventing the breakage of the siloxane bonding by the alkaline solution. As a result, this polymer film can have durability against an alkaline solution. Furthermore, the molecule having a fluoroalkyl chain in the middle part is stiffer than a molecule having a hydrocarbon chain in the middle part (the flexibility permissible for the molecular structure is reduced), and therefore this molecule is packed densely and the film density is increased, thus improving the wear resistance and strengthening a bonding force with a substrate.

The present inventors have found that this first-layer film serves as an adhesive layer between the substrate and the second-layer film. Especially, in the case of a substrate made of platinum and mica having a small density of hydroxyl groups on the surface thereof, when the second-layer film is formed directly thereon, the adhesion of the film is low. On the contrary, the provision of the adhesive layer can improve the adhesion of the water-repellent film.

[Embodiment 3]

The third embodiment of the present invention is configured with a three-layered thin film. That is, a first-layer film that contacts with a substrate is made of a mixture of a silicon oxide and a titanium oxide. A second-layer film formed on the first layer film is a polymer that is made up of a molecule having at least one or more of siloxane bonding (—Si—O—) at both ends and a fluorocarbon chain in the middle part, and a third-layer film formed on the second-layer film includes a molecule (A) having at least one or more of siloxane bonding (—Si—O—) at both ends and a hydrocarbon chain in the middle part and a molecule (B) having a fluorocarbon chain at one end and at least one or more of siloxane bonding (—Si—O—) at another end, where a polymer is formed with the molecule (A) and the molecule (B).

Herein, the film configuration of the second-layer film and the third-layer film is basically the same as that shown in Embodiment 2.

The silicon oxide and the titanium oxide have higher hardness as compared with the second-layer and third-layer polymer films, and have better adhesion with the substrate. The present inventors have found that the titanium oxide film provides the film with alkali resistance and the silicon oxide film functions so as to improve the adhesion between the substrate and the second-layer film. Then, the present inventors have found that the first-layer film is made of the mixture of titanium and silicon, and the second-layer and third-layer films are formed thereon, whereby an alkali resistant water-repellent film having high adhesion with the substrate can be formed.

Furthermore, in the water-repellent film of this embodiment, the first-layer film completely prevents an alkaline solution from intruding into the substrate, and therefore by forming the water-repellent film on a substrate having low alkali resistance, the alkali resistance of the substrate can be improved.

[Embodiment 4]

The fourth embodiment of the present invention is configured with a two-layered thin film. That is, a first-layer film that contacts with a substrate is made of a mixture of a silicon oxide and a titanium oxide, where a ratio of the silicon to the titanium is in the range from 10% to 30% in terms of mols, and a second-layer film formed on the first-layer film is made up of a hydrolyzate and/or a dehydrated polymer of a silane coupling agent having a fluorocarbon chain.

When the silicon oxide film alone is included, the adhesion density to the second-layer film is high because high-density silanol groups (—SiOH) are present on the surface thereof, but the film lacks alkali resistance. When the titanium oxide film alone is included, the adhesion density of the film is lower because the density of hydroxyl groups on the surface is lower compared to the silicon oxide film, but the alkali resistance is improved. The present inventors have found that, when the ratio of silicon atoms to titanium atoms in the first-layer film is within a range of 10% to 30% in terms of mols, the adhesion density to the second-layer film is high and the alkali resistance is improved.

Figure 2:
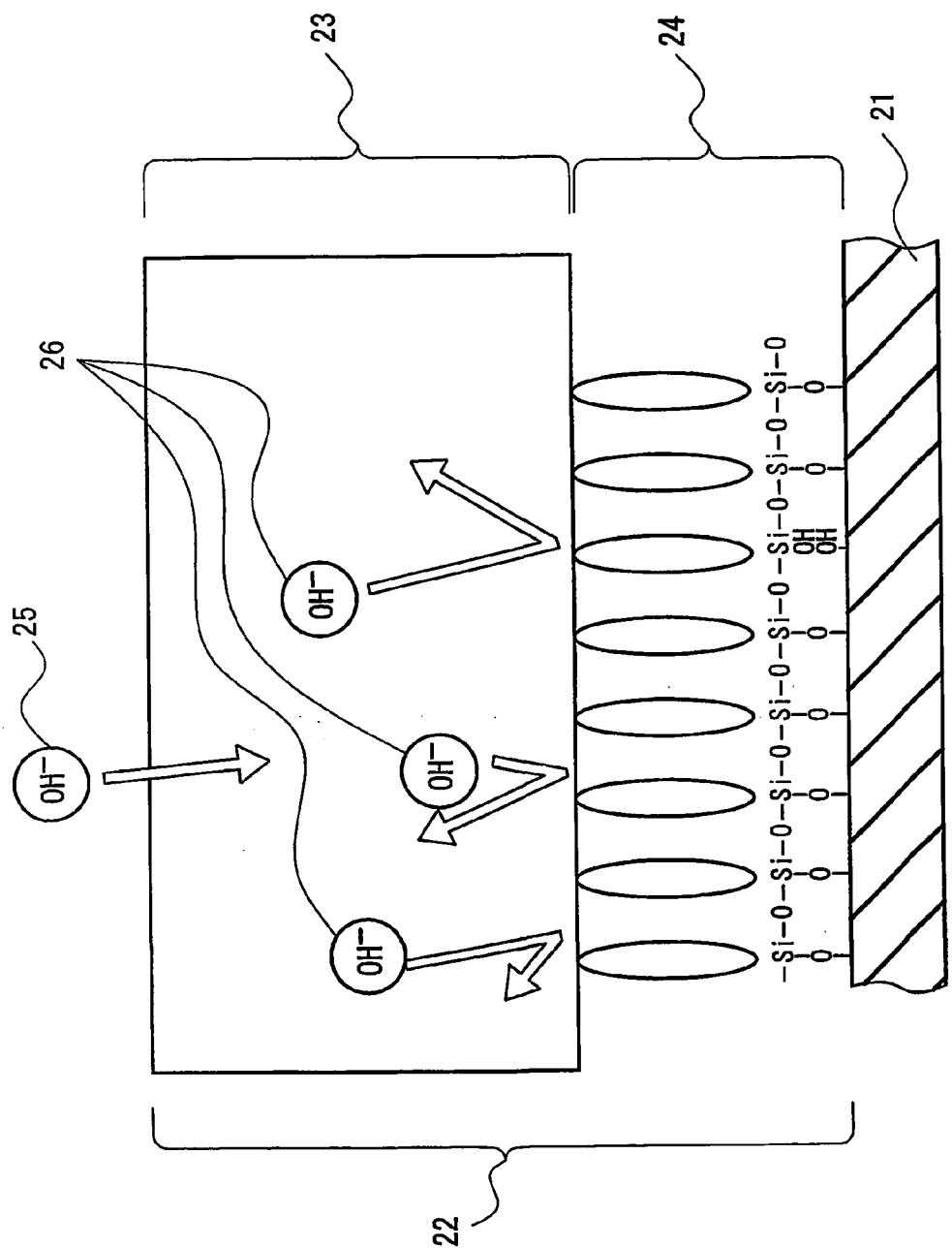
FIG. 2 schematically shows a state where a water-repellent film according to Embodiment 4 of the present invention, which is formed on a solid substrate, is exposed to an alkaline component.

FIG. 2 shows one example of a water-repellent film according to this embodiment. In FIG. 2, reference numeral 21 denotes the first-layer film, 22 denotes the second-layer film, 23 denotes a portion of the water-repellent film in the second-layer film that is distant from the first-layer film and 24 denotes a portion of the water-repellent film in the second-layer film that is near to the first-layer film. In this film structure, the water-repellent film 24 made of the second-layer film, located near to the first-layer film has a high density, so that the film does not peel off the first layer due to alkaline components 26 that intrude through the water-repellent film 23 as the portion of the second-layer film that is distant from the first-layer film. Here, in FIG. 2, reference numeral 25 denotes an ion of the alkaline component that intrudes into the water-repellent film.

[Embodiment 5]

The fifth embodiment of the present invention relates to a method for producing a water-repellent film on a solid substrate, in which a silane coupling agent (A) having reactive functional groups at both ends and including a hydrocarbon chain in the middle part; a silane coupling agent (B) having a fluorocarbon chain at one end and a reactive functional group at another end; an organic solvent; water and an acidic catalyst are mixed to produce a coating solution, and this coating solution is applied to the substrate, followed by heating of the substrate, so as to form a polymer with the silane coupling agent (A) and the silane coupling agent (B).

In the organic solvent, water and acidic catalyst, a coupling part, —Si—X (X represents an alkoxyl group, chlorine, acyloxy, or amine) of the silane coupling agent participates in the reactions expressed by the following chemical formulae Formula 1 to Formula 3.

—Si—X+H$_2$O→—Si—OH+HX    (Formula 1)

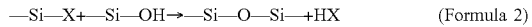
—Si—X+—Si—OH→—Si—O—Si—+HX    (Formula 2)

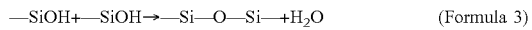
—SiOH+—SiOH→—Si—O—Si—+H$_2$O    (Formula 3)

The reaction expressed by Formula 1 shows the generation of a silanol group (Si—OH) by hydrolysis; Formulas 2 and 3 show the generation of a siloxane bonding (—Si—O—) by a dehydration polymerization, respectively.

Right after a predetermined amount of silane coupling agent, organic solvent, water and acid catalyst are mixed, the reactions expressed by the chemical formulas Formula 1 to Formula 3 occur. Therefore, the coating solution contains a hydrolyzate, a dehydrated polymer, or a molecule having unreacted reactive functional groups of the silane coupling agent, which are mixed therein. Since the reactions of the Formula 1 to Formula 3 proceed quickly, the coating solution can be applied to the substrate right after the preparation of the coating solution. However, the temperature of the coating solution increases right after mixing due to the heat resulting from chemical reaction, which might cause variations in the application state, and therefore it is desirable that the application is conducted after 1 to 2 hours have passed after mixing. When this coating solution is applied to the substrate, a film is formed on the substrate. Right after the application, the film includes the silane coupling agent, solvent, water, and acid catalyst. However, when the substrate is heated at 100° C. or more, the solvent, water and acid catalyst are evaporated, and accordingly, unreacted reactive functional groups become silanol or the dehydration polymerization reaction between silanol groups proceeds. As a result, a solid thin film is formed on the substrate.

Figure 3:
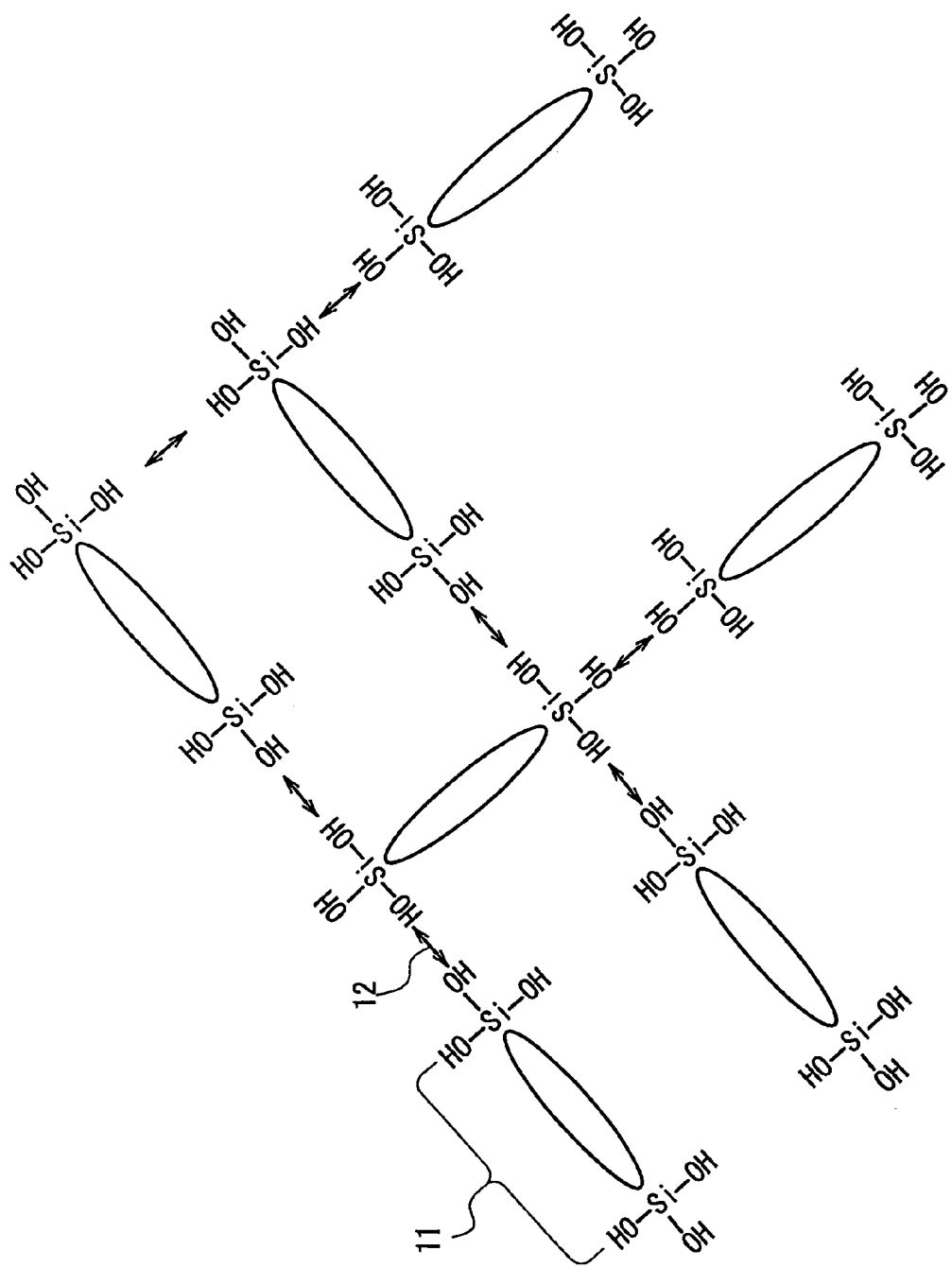
FIG. 3 is a schematic view showing a process in which a high density polymer film is formed according to Embodiment 5 of the present invention.

As shown in FIG. 3, since the silane coupling agent (A) 11 has reactive functional groups at both ends of the molecule, dehydration polymerization reaction takes place in a portion as shown by an arrow 12 so as to form a high density three-dimensional polymer film. Therefore, the formed film has a structure in which the silane coupling agent (B) is fixed to the three-dimensional polymer film of the silane coupling agent (A) via siloxane bonding. Note here that in the film, the silane coupling agent (A) and the silane coupling agent (B) are bonded to each other via siloxane bonding to form a polymer film. However, in the film, unreacted reactive functional groups or silanol groups (Si—OH) may remain. The higher the baking temperature is, the fewer of these groups remain. Furthermore, when hydroxyl groups (—OH) are present on the surface of the substrate, the silane coupling agent causes a dehydration reaction with the hydroxyl groups to form siloxane bonding or hydrogen bonding. Therefore, the water-repellent film is fixed to the substrate firmly.

Note here that, in the present invention, right after the application of the coating solution, the silane coupling agent (A) forms the three-dimensional polymer film, whereas the silane coupling agent (B) moves across the film due to the thermal diffusion. This movement is finished at the time when a liquid component in the film is evaporated away to some extent. As a result of this movement, the density of the silane coupling agent (B) increases on the surface of the film. That is to say, in an aggregation of materials having various surface energy levels, it is known that the materials having different surface energy values cause phase separation therebetween, and materials having closer levels tend to gather. Since the hydrocarbon chain included in the silane coupling agent (A) and the fluorocarbon chain included in the silane coupling agent (B) repel each other, phase separation is likely occur in the film. On the other hand, right after the application of the coating solution to the substrate, the surface of the coating solution contacts with air, and the surface energy of the air is the smallest among all materials. The fluorocarbon chain in the silane coupling agent (B) has the smallest surface energy in the coating solution. Therefore, although the silane coupling agent (B) in the coating solution moves in various directions, when it reaches the surface of the coating solution and the molecule contacts with air having smaller surface energy, this molecule becomes fixed. As a result, the silane coupling agent (B) generates the phase separation from the silane coupling agent (A) while being fixed near the surface of the film. This means that even when the amount of the silane coupling agent (B) in the coating solution is reduced relative to the silane coupling agent (A), the density of the fluorocarbon chain increases at the surface of the film, so that the film exhibits water repellency. In order to realize a film with high wear resistance, it is important that the film with high water repellency can be obtained even when the ratio of the silane coupling agent (B) is small. This is because the silane coupling agent (B) has a reactive functional group only at one end of the molecule, which makes it difficult to form a three-dimensional polymer film. Therefore, when the ratio of the silane coupling agent (B) in the film increases, the density of the film decreases, thus decreasing the wear resistance thereof.

As the silane coupling agent (A), $X_sQ_{3-s}Si(CH_2)_nSiR_{3-m}X_m$ in which alkoxyl groups are present at both ends of a straight-chain hydrocarbon is preferable (Q and R represent a methyl group or an ethyl group; n represents a natural number between 1 and 10; s and m represent a natural number between 1 and 3, when s=1 and m=1 are satisfied, two Qs and Rs are present respectively, but each of the two Qs and Rs may have a different structure).

Furthermore, when the silane coupling agent (A) includes a benzene ring, the heat resistance of the water-repellent film is improved because the benzene ring has high heat resistance. Furthermore, the molecule including a benzene ring is stiffer as compared with a molecule that does not include a benzene ring (the flexibility permissible for the molecular structure is reduced), and therefore this molecule is packed densely and the film density is increased, thus improving the wear resistance. The silane coupling agent (A) including a benzene ring includes $X_sQ_{3-s}Si(CH_2)_tC_6H_4(CH_2)_uSiR_{3-m}X_m$ (Q and R represent a methyl group or an ethyl group; t and u represent a natural number between 1 and 10; s and m represent a natural number between 1 and 3, when s=1 and m=1 are satisfied, two Qs and Rs are present respectively, but each of the two Qs and Rs may have a different structure). Herein, in order to improve the heat resistance of the produced film, it is preferable that the straight-chain hydrocarbon chain is made as short as possible and t and u range from 1 to 3.

Note here that, as the number of carbons constituting the straight-chain hydrocarbon chain of the silane coupling agent (A) increases, the chain increasingly prevents the alkaline component from intruding into the siloxane bonding, but conversely the density of the film decreases, thus decreasing the wear resistance. The present inventors have found that, when the number of carbons constituting the straight-chain hydrocarbon chain of the molecule (A) ranges from 1 to 10, a film with excellent alkali resistance and excellent wear resistance can be realized.

Furthermore, the silane coupling agent (B) includes $CF_3(CF_2)_nC_2H_4SiR_{3-m}X_m$ (R represents a methyl group or an ethyl group; n represents a natural number between 1 and 12; m represents a natural number between 1 and 3, when m=1 is satisfied, two Rs are present, but each of the two Rs may have a different structure). Herein, in order to provide a film with high water repellency, n=6 to 10 is preferable.

Note here that, as the ratio of the silane coupling agent (B) increases, the water repellency of the film is improved, but conversely the wear resistance thereof decreases. Conversely, as the ratio of the molecules (B) decreases, the wear resistance of the film is improved but the water repellency thereof decreases. The present inventors have found that when the mol ratio of the silane coupling agent (B)/the silane coupling agent (A)=0.001 to 0.2 is satisfied, a film with excellent water repellency and excellent wear resistance can be realized.

In order to apply the coating solution to the substrate so as to form a film, the coating solution desirably has fluidity. To this end, it is desirable that only a part of the silane coupling agents in the coating solution is polymerized. This is because if all of the silane coupling agents are polymerized, the coating solution becomes a gel (a solid state including some liquid characteristics, exemplified by agar, bean curd, etc.) and loses fluidity, making it impossible to apply it to the substrate. In the case where X of the silane coupling agent is chlorine, the reactivity of the coupling part is too high. Therefore, unless the amount of water is strictly controlled, the coating solution easily becomes a gel. On the contrary, in the case where X is an alkoxyl group, hydrolysis and dehydration polymerization reaction proceed slowly in the presence of water and acid, so that the coating solution can be applied to the substrate easily.

In order to carry out hydrolysis and dehydration polymerization reaction of a silane coupling agent having silane coupling parts of α in number per molecule completely so as to form a three-dimensional polymer, water molecules of α/2 in number are required for one molecule of the silane coupling agent, as determined theoretically from the formulas Formula 1 to Formula 3. Practically, however, even when the theoretically required amount of water is present, the silane coupling parts do not react completely, and the degree of progress of the reaction will be different depending on the types of the silane coupling agents. This is because the reaction speed of Formula 1 to Formula 3 is varied depending on the conditions such as the three-dimensional structure of molecules of the silane coupling agent, the types of functional groups located in the vicinity of the silane coupling parts, and the types of the catalyst. Generally, however, as the amount of water molecules increases, the reaction speed increases. If the amount of water is increased too much, the polymerization of the silane coupling agent proceeds excessively, resulting in the failure of dissolving it in the coating solution, which causes the tendency of the coating solution to become cloudy. When the cloudy coating solution is applied to the substrate, a uniform film cannot be obtained. The present inventors have found that, in the case of the silane coupling agent (A) having a benzene ring, if the mol ratio of water/molecule (A)=20 to 150 is satisfied, the silane coupling agent can react sufficiently so that the coating solution does not get cloudy, whereby a film with excellent wear resistance, in which three-dimensional polymerization proceeds sufficiently, can be formed.

Figure 4:
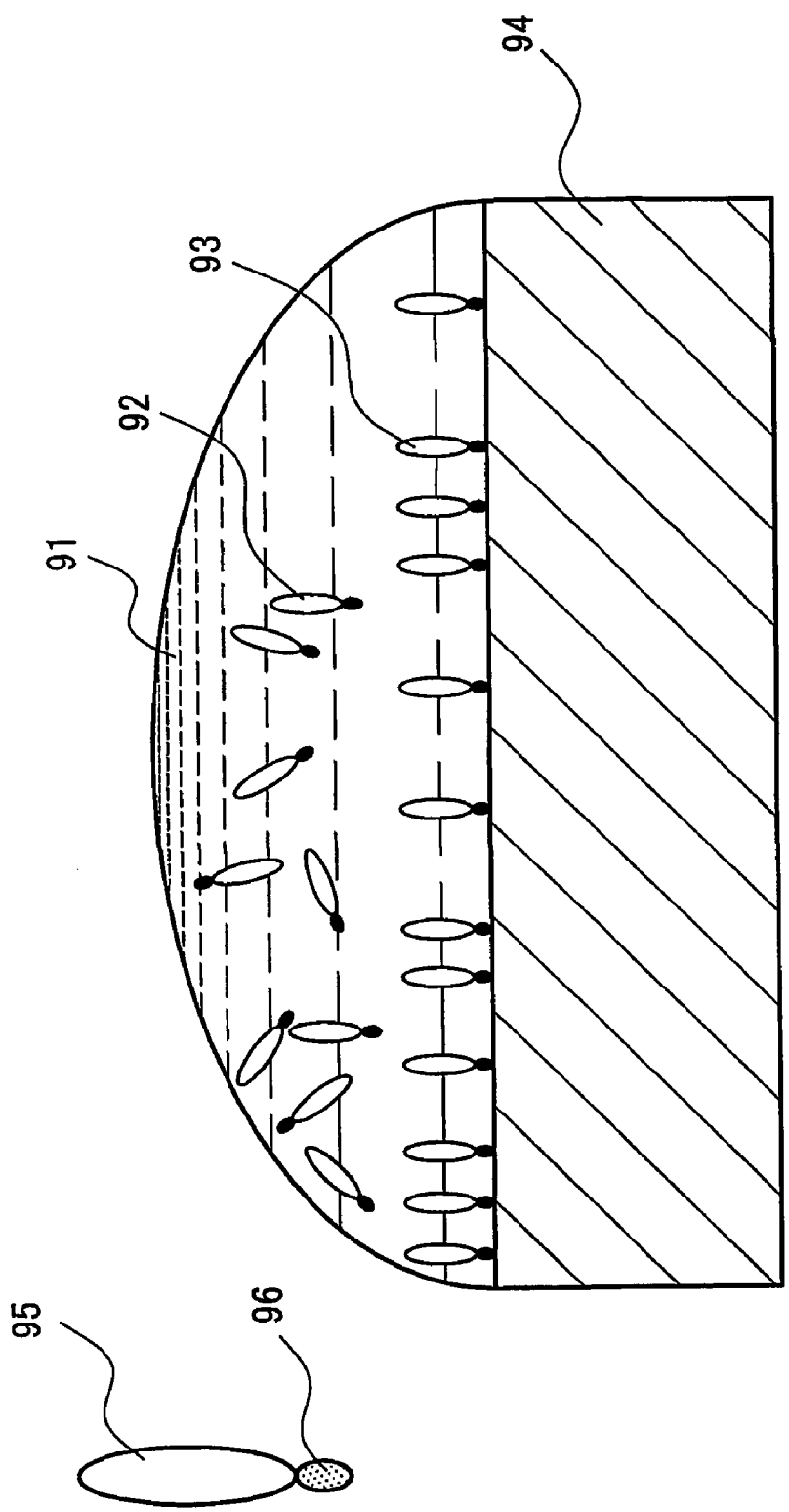
FIG. 4 is a schematic view showing a state of the surface of a substrate that is exposed to a solution containing straight-chain molecules according to Embodiment 5 of the present invention.
Figure 5A:
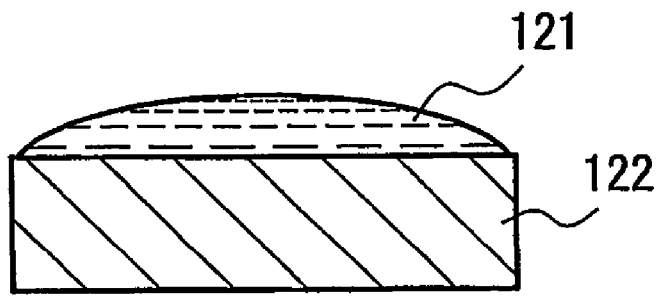
FIG. 5A is a schematic view showing a state right after a coating solution containing a silane coupling agent having a fluoroalkyl chain is exposed to a substrate.
Figure 5B:
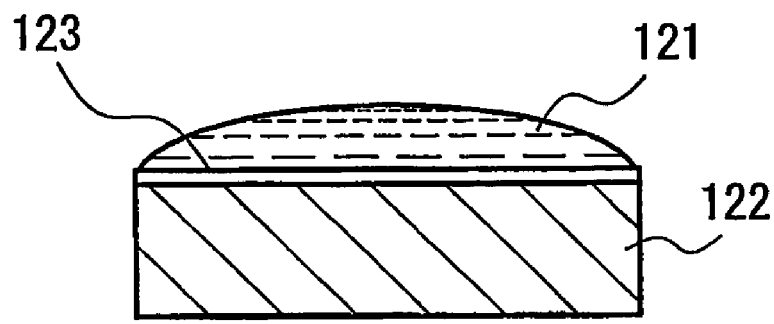
FIG. 5B is a schematic view showing a state where the silane coupling agent having a fluoroalkyl chain is absorbed to the surface of the substrate and C is a schematic view showing a state of the surface of the substrate repelling the coating solution.
Figure 5C:
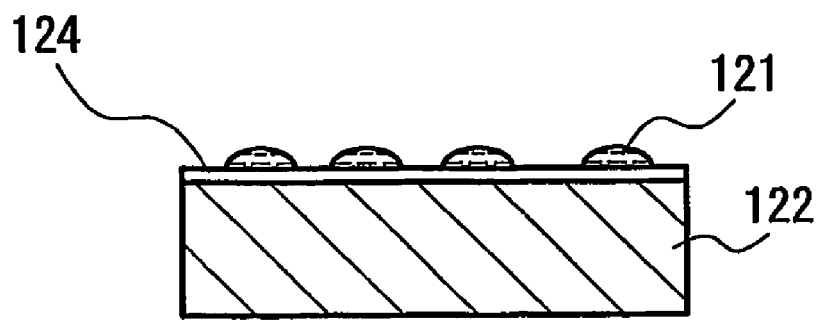

In order to form a uniform film by applying the coating solution to the substrate, it is necessary for the coating solution to have a sufficient wettability with the substrate. Meanwhile, when a solution, in which straight-chain molecules having a flouoroalkyl chain at one end and a hydrophilic group at the other end are dissolved, is exposed to a substrate, the straight-chain molecules are absorbed to the substrate so that the hydrophilic group side is directed to the substrate side and the fluoroalkyl chain side is directed to the opposite side. As a result, the surface of the substrate exhibits water repellency. Since a part of the silane coupling agent (B) of the coating solution is hydrolyzed to have a hydrophilic silanol group, when the coating solution is applied to the substrate, the silane coupling agent is absorbed to the outermost surface of the substrate (FIG. 4). In FIG. 4, reference numeral 91 denotes a solution in which straight-chain molecules are dissolved, 92 denotes the straight-chain molecules in the solution, 93 denotes a straight-chain molecule that is absorbed to the surface of a substrate, 94 denotes the substrate, 95 denotes a water-repellent portion of the straight-chain molecule and 96 denotes a hydrophilic portion of the straight-chain molecule. Due to this configuration, the surface of the substrate has water repellency, so as to repel the coating solution (FIGS. 5A to C), resulting in the failure of the uniform application of the coating solution to the substrate. The present inventors have found that, even in the case of the coating solution including a silane coupling agent having a fluoroalkyl chain, the surface tension of the coating solution can be reduced by mixing alcohol including fluorocarbon therewith, whereby the wettability with the substrate remarkably can be improved. In FIGS. 5A to C, reference numeral 121 denotes a coating solution, 122 denotes a substrate, 123 denotes a surface exhibiting water repellency and 124 indicates a coating solution in the state where the coating solution has reduced wettability with the substrate so as to be repelled against the surface of the substrate.

Furthermore, as a result of the detailed examination by the present inventors as to the procedure for applying the coating solution to the substrate so as to form a thin film, it has been found that, when a dew point of the atmosphere for applying the coating solution to the substrate is lower than the temperature of the atmosphere by 5° C. or more, a uniform film can be produced on the substrate. The reason for this will be described below. That is to say, after the coating solution is applied to the substrate, an organic solvent in the coating solution is evaporated, and the heat caused by the evaporation lowers the temperature of the substrate. Therefore, the surface temperature of the substrate becomes lower than the atmosphere to which the substrate is exposed. When the temperature difference between the surface of the substrate and the atmosphere is increased, the water vapor contained in the atmosphere condenses on the surface of the substrate. This occurs from the same principal as in the phenomenon in which, when cold drink is poured into a glass on a hot day in the summer, water droplets are formed on an outer side of the glass. If the condensation of water contents occurs on the substrate, the surface tension of the coating solution increases, which deteriorates the wettability of the coating solution to the substrate. As a result, it becomes difficult to form a uniform film. As a result of the repetition of various experiments by the present inventors, it has been found that when a dew point of the atmosphere is lower than the temperature of the atmosphere by 5° C. or more, the condensation does not occur on the surface of the substrate.

[Embodiment 6]

The sixth embodiment of the present invention relates to a method for producing a water-repellent film on a solid substrate. The method includes the steps of: applying a first coating solution to the substrate, where the first coating solution is prepared by mixing a silane coupling agent having reactive functional groups at both ends and including a fluorocarbon chain in the middle part, an organic solvent, water and an acidic catalyst; applying a second coating solution to the substrate, where the second coating solution is prepared by mixing a silane coupling agent (A) having reactive functional groups at both ends and including a hydrocarbon chain in the middle part, a silane coupling agent (B) having a fluorocarbon chain at one end and a reactive functional group at another end, an organic solvent, water and an acidic catalyst; and heating of the substrate so as to form a polymer with the silane coupling agent (A) and the silane coupling agent (B).

As the silane coupling agent in the first coating solution, for example, $X_sQ_{3-s}SiC_2H_4(CF_2)_n C_2H_4SiR_{3-m}X_m$ (X represents an alkoxyl group, Q and R represent a methyl group or an ethyl group; n represents a natural number between 1 and 10; s and m represent a natural number between 1 and 3, when s=1 and m=1 are satisfied, two Qs and Rs are present respectively, but each of the two Qs and Rs may have a different structure). Generally, a fluorine atom in the compound has a high electronegativity, having a property of attracting electrons of a neighbor atom. In the silane coupling agent of the present invention also, a fluorine atom attracts electrons from a neighbor atom, resulting in the shortage state in electrons of silicon. As a result, the bonding between the silicon and X becomes ionic bonding, in which hydrolysis proceeds easily. Therefore, the reactivity of the silane coupling agent having a fluorocarbon chain is higher than that of the silane coupling agent including a hydrocarbon chain only, and hydrolysis and dehydration polymerization reaction proceeds sufficiently, so that the polymerization degree of the film increases and the film become robust. Furthermore, when the substrate includes hydroxyl groups, the siloxane bonding with the substrate is easy to be formed, so that the film can be fixed to the substrate firmly. Moreover, the fluorocarbon chain is stiff (the flexibility permissible for the molecular structure is reduced), and therefore this silane coupling agent is packed densely, thus making the film robust.

The coating solution for the second layer is the same as the coating solution described in Embodiment 5. Right after the application of the first coating solution to the substrate, there are a number of silanol groups in a hydrolyzed state in the silane coupling agent. For that reason, when the second coating solution is applied to this, followed by baking, then the silane coupling agent in the second coating solution forms the siloxane bonding with the silane coupling agent in the first coating solution so that these two films are boned to each other firmly. The present inventors have found that, as a result of these steps, the first-layer film functions as an adhesion layer between the second-layer film and the substrate, so that the water-repellent film can be bonded to the substrate firmly.

Here, when the first coating solution and the second coating solution are applied continuously, the temperature of the final baking cannot be made higher than the heat-resistant temperature of the second-layer film. This is because the heat resistance of the second-layer film having the hydrocarbon chain is lower than that of the first-layer film. Thus, after the first coating film is applied to the solid substrate, followed by the heating at 100° C. to 300° C., inclusive, the second coating solution is applied to the substrate, whereby the density of the first-layer film and the adhesion of the same to the substrate can be improved. In this case also, since there are a number of silanol groups on the surface of the first-layer film after baking, the adhesion between the first-layer film and the second-layer film is high.

This embodiment is especially effective for forming a water-repellent film with high adhesion on a substrate with a low density of hydroxyl groups on the surface thereof, such as platinum and mica.

[Embodiment 7]

The seventh embodiment of the present invention relates to a method for producing a water-repellent film on a solid substrate. The method includes the steps of: applying a first coating solution to the substrate, followed by baking, where the first coating solution is prepared by mixing titanalkoxide, siliconalkoxide, an organic solvent, water and acidic catalyst; applying a second coating solution to the substrate, where the second coating solution is prepared by mixing a silane coupling agent having reactive functional groups at both ends and including a fluorocarbon chain in the middle part, an organic solvent, water and an acidic catalyst; applying a third coating solution to the substrate, where the third coating solution is prepared by mixing a silane coupling agent (A) having reactive functional groups at both ends and including a hydrocarbon chain in the middle part, a silane coupling agent (B) having a fluorocarbon chain at one end and a reactive functional group at another end, an organic solvent, water and an acidic catalyst; and heating of the substrate so as to form a polymer with the silane coupling agent (A) and the silane coupling agent (B).

The titanalkoxide includes titanium tetraethoxide (Ti$(OC_2H_5)_4$), titanium tetra normal propoxide (Ti$(OC_2H_4CH_3)_4$), titanium tetra isopropoxide (Ti$(OCHCH_3CH_3)_4$), titanium tetra normal butoxide (Ti$(OC_3H_6CH_3)_4$), etc. The siliconalkoxide includes tetra methoxysilane (Si$(OCH_3)_4$), tetra ethoxysilane (Si$(OC_2H_5)$4), etc. Here, the titanalkoxide generally has high reactivity, generating hydrolysis and dehydration polymerization reaction with a small amount of water, which makes the coating solution unstable. Therefore, in order to suppress the reaction of the titanalkoxide, an inhibitor is added to the coating solution. As the inhibitor, for example, a β-diketone compound such as acetylacetone and acetoace tic ester, and amine are available. When the first coating solution is applied to the substrate, followed by baking, then a mixed film of titanium oxide ($TiO_x$; $0<X\leq 2$) and silicon oxide ($SiO_y$; $0<y\leq 2$) is formed. After that, the second and the third coating solutions are applied to this film in the same manner as in Embodiment 6, whereby a water-repellent film having alkali resistance can be formed.

Here, the titanium oxide in the first-layer film provides the film with alkali resistance. The silicon oxide has a silanol group, and by virtue of the hydrogen bonding or the siloxane bonding of this silanol group, the second-layer film can be bonded to the first-layer film firmly. As a result of examinations by the present inventors so far, it has been found that, in the case where the first layer does not contain silicon oxide at all, if the water-repellent film is soaked in an alkaline solution for a long time, then the second layer sometimes peels off the first layer. In addition, the present inventors have found that, in the case where a water-repellent film is formed on a substrate made of such as platinum and mica with reduced oxide film and active oxygen on the surface thereof, this first-layer film is effective.

As the temperature for baking the first layer is increased, the film with better adhesion with the substrate and higher alkali resistance can be formed. Preferable temperatures are 300° C. to 500° C.

This embodiment is especially effective for forming a water-repellent film on a glass or a ceramic with reduced alkali resistance.

[Embodiment 8]

The eighth embodiment of the present invention relates to a method for producing a water-repellent film on a solid substrate. The method includes the steps of: applying a first coating solution to the substrate, followed by baking at 300° C. or higher, where the first coating solution is prepared by mixing titanalkoxide, siliconalkoxide, an organic solvent, water and acidic catalyst; applying a second coating solution to the substrate, where the second coating solution is prepared by mixing a silane coupling agent having a fluorocarbon chain, an organic solvent, water and an acidic catalyst; and heating the substrate at 100° C. or higher. In the first coating solution, a ratio of the siliconalkoxide to the titanalkoxide ranges from 10% to 30% in terms of mols.

Similarly to Embodiment 7, the titanalkoxide includes titanium tetraethoxide ($Ti(OC_2H_5)_4$), titanium tetra normal propoxide ($Ti(OC_2H_4CH_3)_4$), titanium tetra isopropoxide ($Ti(OCHCH_3CH_3)_4$), titanium tetra normal butoxide ($Ti(OC_3H_6CH_3)_4$), etc. The siliconalkoxide includes tetra methoxysilane ($Si(OCH_3)_4$), tetra ethoxysilane ($Si(OC_2H_5)_4$), etc. Here, the titanalkoxide generally has high reactivity, generating hydrolysis and dehydration polymerization reaction with a small amount of water, which makes the coating solution unstable. Therefore, in order to suppress the reaction of the titanalkoxide, an inhibitor is added to the coating solution. As the inhibitor, for example, a β-diketone compound such as acetylacetone and acetoacetic ester, and amine are available. When the first coating solution is applied to the substrate, followed by baking, then a mixed film of titanium oxide ($TiO_x$; $0<X\leq 2$) and silicon oxide ($SiO_y$; $0<y\leq 2$) is formed. In addition, similarly to Embodiment 5, the silane coupling agent having a fluorocarbon chain includes $CF_3(CF_2)_nC_2H_4SiR_{3-m}X_m$ (R represents a methyl group or an ethyl group; n represents a natural number between 1 and 12; m represents a natural number between 1 and 3, when m=1 is satisfied, two Rs are present, but each of the two Rs may have a different structure).

Herein, in order to provide a film with high water repellency, n=6 to 10 is preferable. In addition, in order to control the reaction of the coating solution favorably, X is preferably an alkoxyl group. Moreover, in order to form a higher density film, m preferably equals 3.

In the silane coupling agent in which an alkoxysilyl group is bonded only to one end of a fluorine straight-chain molecule, it is difficult to form a three-dimensional polymerized film, and the density of the film is lower than that of the film of Embodiment 1 and therefore an alkaline solution easily penetrates through the film. The present inventors, however, have found that, when a ratio of silicon atoms to titanium atoms in the titanium and silicon oxide film as the first layer is in the range from 20% to 30% in terms of mols, sufficient hydroxyl groups are present so that the silane coupling agent in the second layer can be attached thereto with high density, and moreover the film has resistance against an alkaline solution.

As the temperature for baking the first layer is increased, the film with better adhesion with the substrate and higher alkali resistance can be formed. Preferable temperatures are 300° C. to 500° C.

[Embodiment 9]

Figure 6:
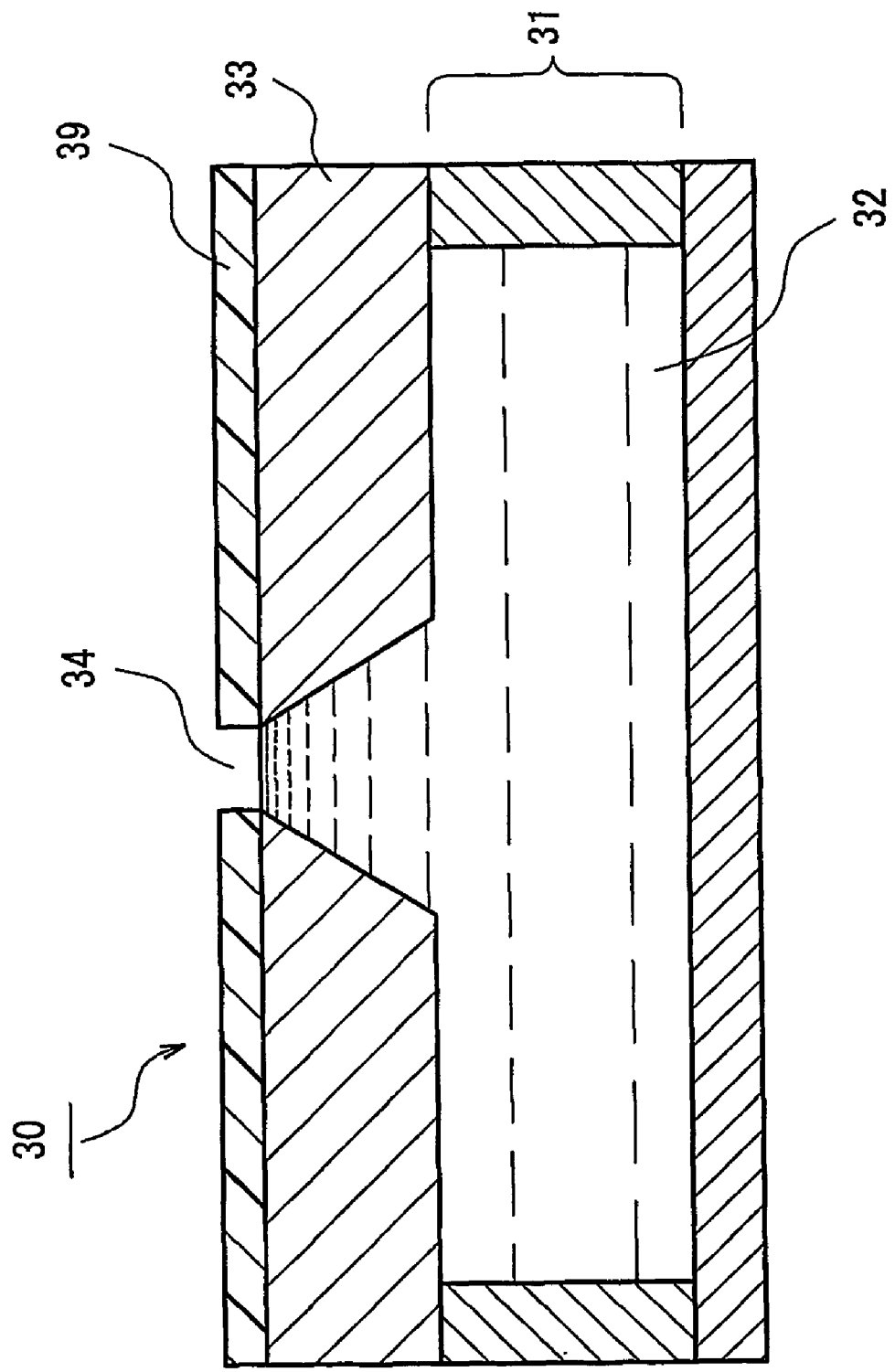
FIG. 6 is a cross-sectional view of a nozzle and the vicinity according to Embodiment 9 of the present invention.

The ninth embodiment of the present invention relates to an ink jet nozzle. As shown in FIG. 6, this embodiment includes as construction components a nozzle plate 33 having a nozzle hole 34 from which ink is discharged and an ink jet nozzle 30 in which a water-repellent film 39 is formed on an ink-discharging side of the plate. As the water-repellent film, the water-repellent film described in Embodiments 1 to 4 is used.

[Embodiment 10]

The tenth embodiment of the present invention relates to a method for producing an ink jet nozzle, in which a water-repellent film is formed on a nozzle plate by the methods of Embodiments 5 to 8 of the present invention.

[Embodiment 11]

Figure 7:
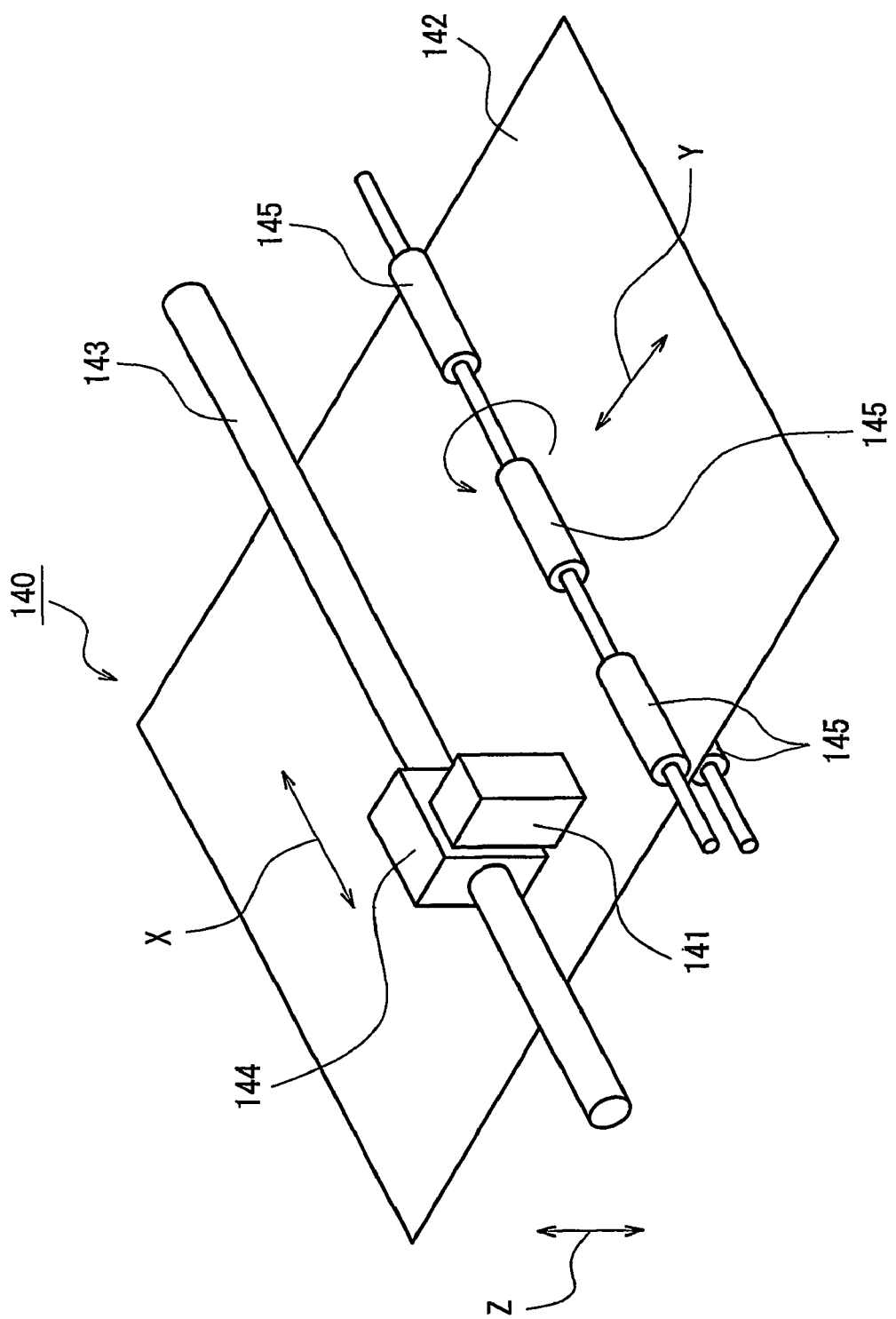
FIG. 7 is a perspective view of an ink jet type recording apparatus according to Embodiment 11 of the present invention.
Figure 8A:
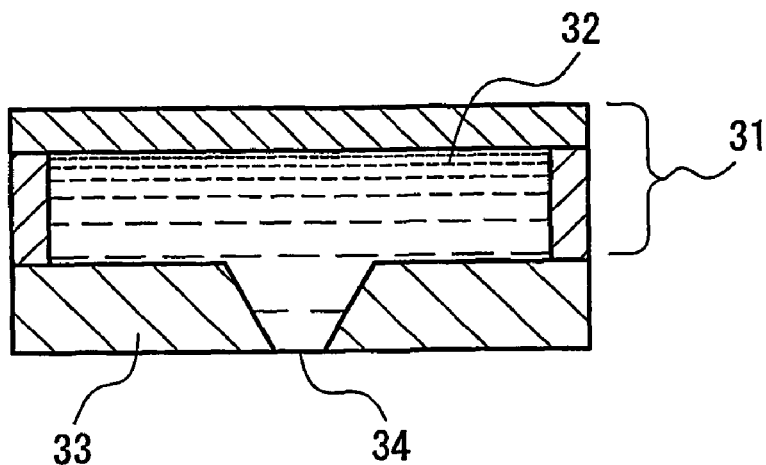
FIG. 8A is a cross-sectional view of a nozzle hole and the vicinity according to the conventional example.
Figure 8B:
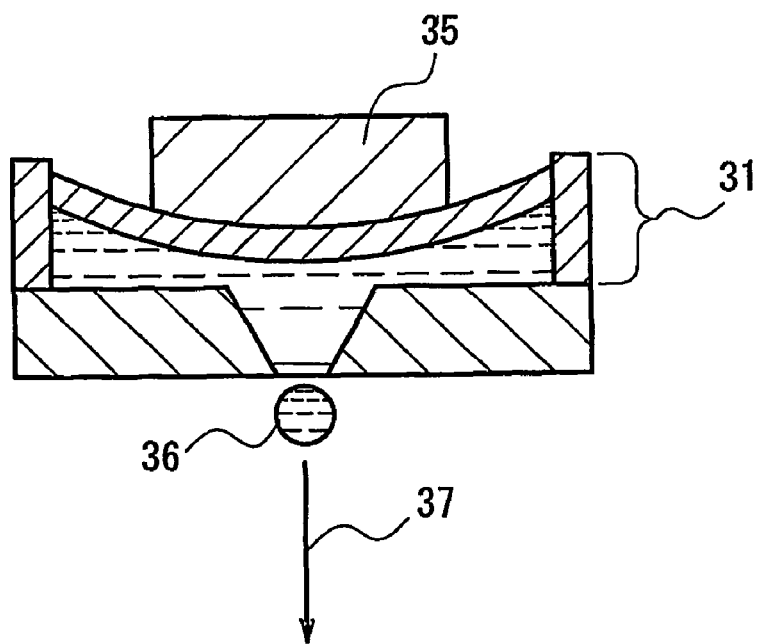
FIG. 8B is a cross-sectional view schematically showing a state in which an ink space therein increases in pressure so as to discharge ink from the hole.
Figure 9A:
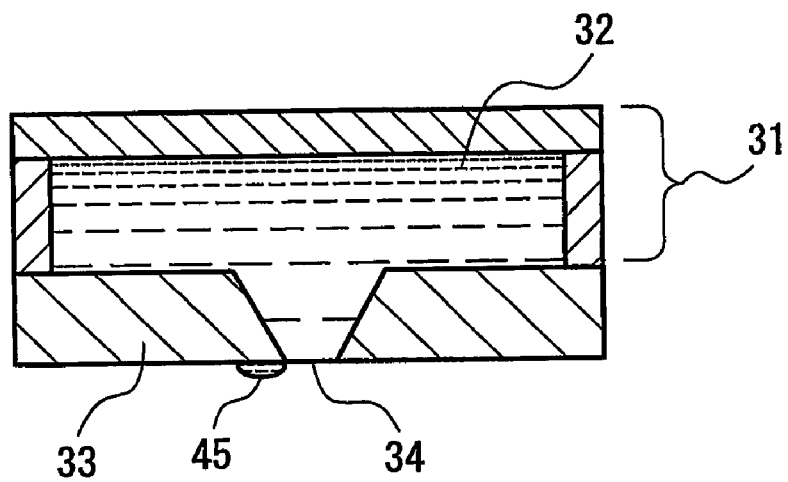
FIG. 9A is a cross-sectional view schematically showing a state in which ink remains at a nozzle hole according to the conventional example.
Figure 9B:
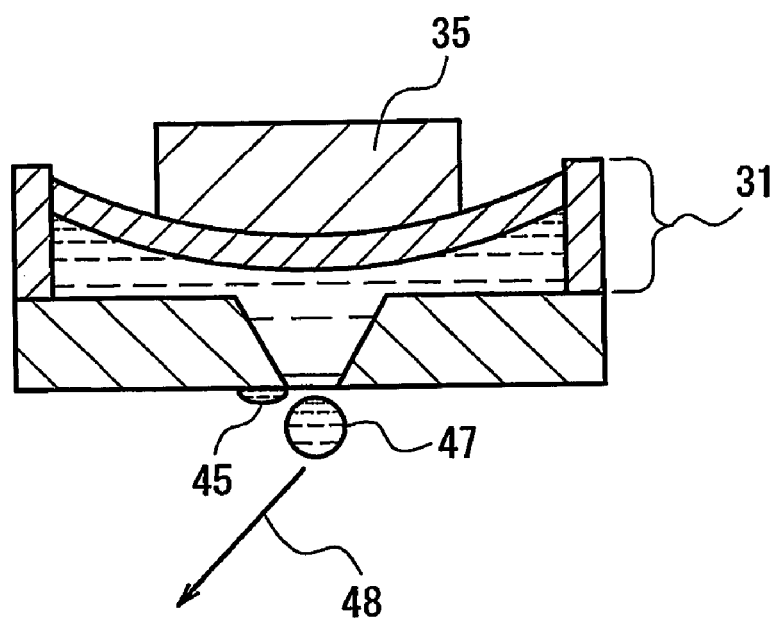
FIG. 9B is a cross-sectional view schematically showing a case where ink is discharged when ink remains at the nozzle hole.
Figure 10A:
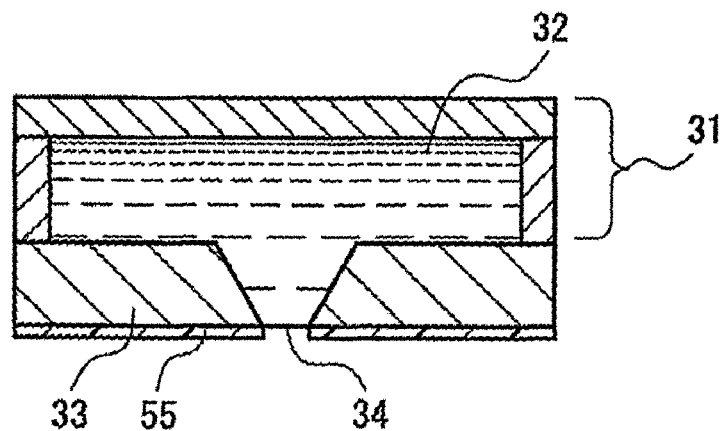
FIG. 10A is a cross-sectional view showing a nozzle plate and the vicinity when a film thickness of the water-repellent film is small according to the conventional example.
Figure 10B:
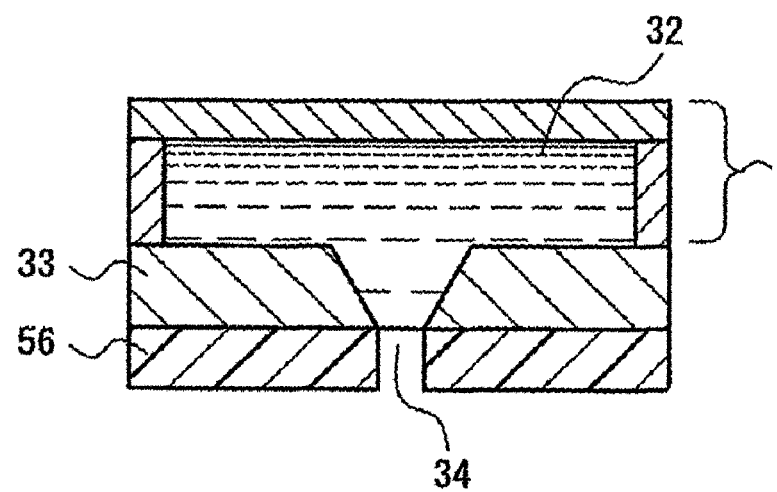
FIG. 10B is a cross-sectional view showing a nozzle plate and the vicinity when a film thickness of the water-repellent film is large.
Figure 11:
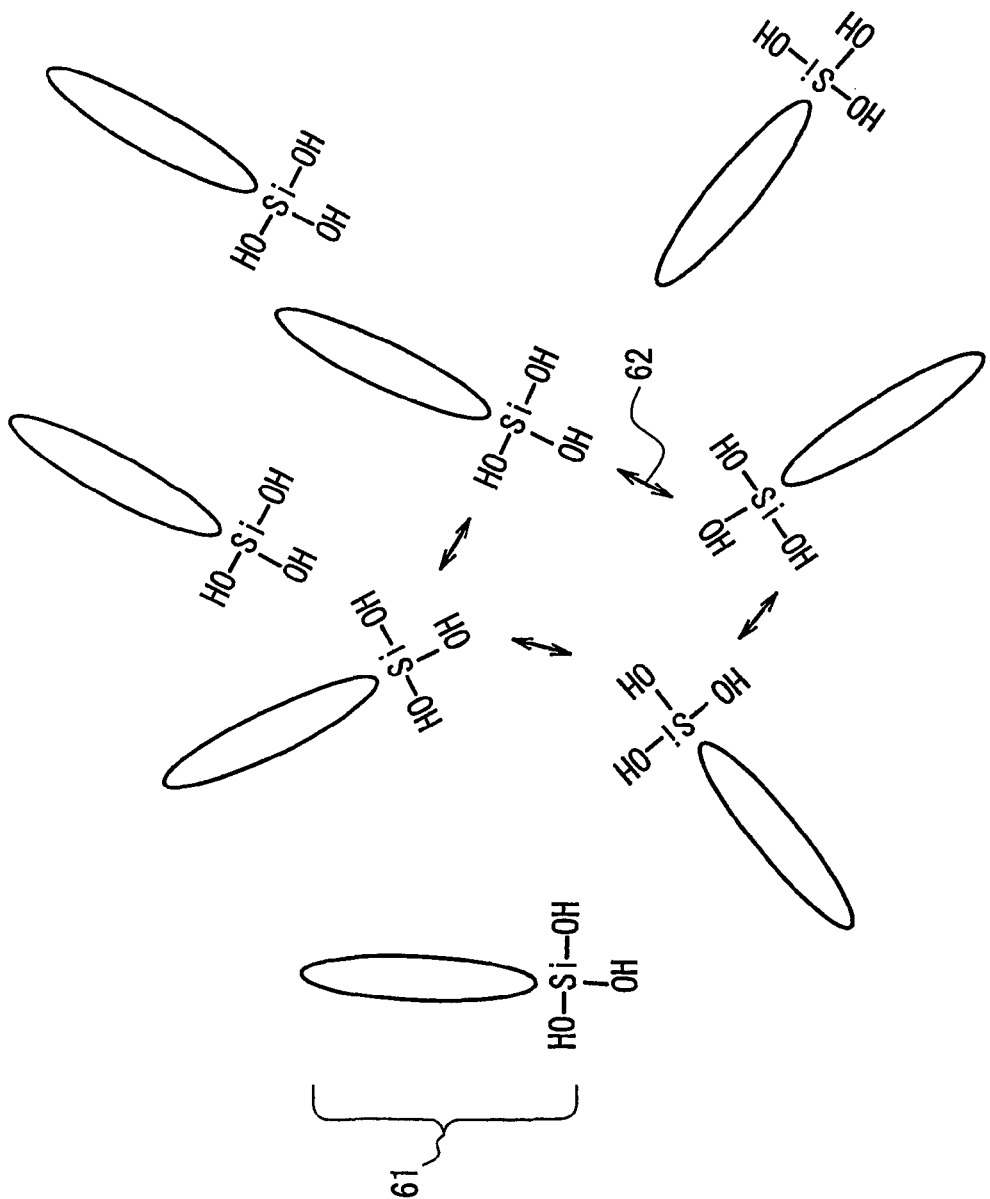
FIG. 11 is a schematic view showing a polymerization of a silane coupling agent having a reaction group at only one end according to the conventional example.
Figure 12A:
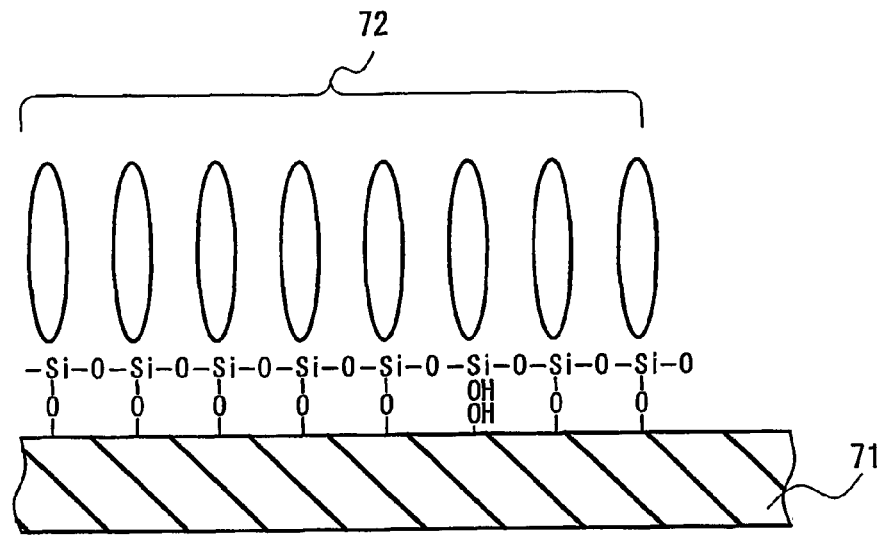
FIG. 12A is a schematic view showing a configuration of a silane coupling agent bonded to a substrate having hydroxyl groups at high density on the surface thereof according to the conventional example.
Figure 12B:
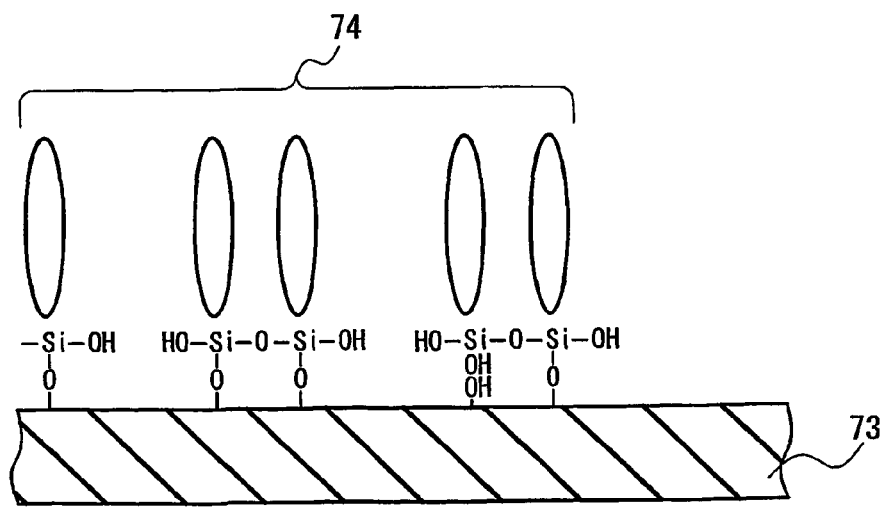
FIG. 12B is a schematic view showing a configuration of a silane coupling agent bonded to a substrate having hydroxyl groups at low density on the surface thereof according to the conventional example.
Figure 13:
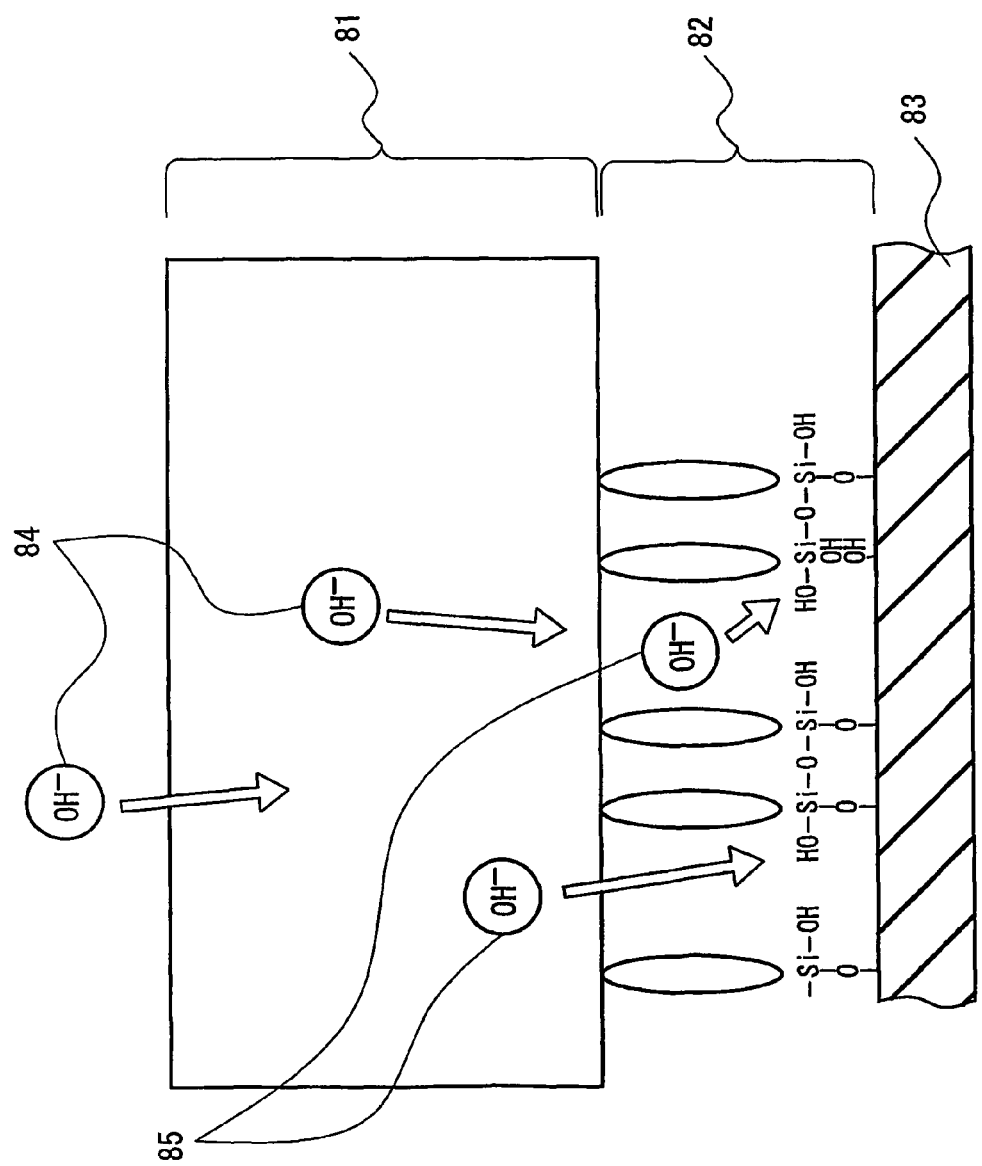
FIG. 13 is a schematic view showing a state in which a water-repellent film formed on a lower layer having a low density of hydroxyl groups according to the conventional example is exposed to an alkaline component.

The eleventh embodiment of the present invention relates to an ink jet type recording apparatus. FIG. 7 schematically shows the overall configuration of an ink jet type recording apparatus having an ink jet head of the present invention. An ink jet type recording apparatus 140 of this drawing is equipped with an ink jet head 141 of the present invention that conducts recording utilizing a piezoelectric effect by a piezoelectric element. Drops of ink that are discharged from this ink jet head 141 arrive on a recording medium 142 such as paper, whereby recording is conducted on the recording medium 142. The ink jet head 141 is mounted on a carriage 144 that is provided along a carriage axis 143 arranged in the main scanning direction X. In accordance with reciprocating motion of the carriage 144 along the carriage axis 143, the ink jet head 141 also performs reciprocating motion in the main scanning direction X. The ink jet type recording apparatus 140 further includes a plurality of rollers (moving means) 145 that move the recording medium 142 relatively in the sub-scanning direction Y that is substantially perpendicular to the width direction of the ink jet head 141 (i.e., the main scanning direction X).

The following describes specific examples of the present invention. Note here that the present invention is not limited to the following examples.

EXAMPLE 1

A stainless substrate (SUS304) having a size of 5 cm×5 cm and a thickness of 0.2 mm was used as a substrate. A coating solution was prepared by mixing chemical substances having the following components:
(1) Ethanol: 60 ml
(2) 1,6-bis(trimethoxysilyl)hexane $((CH_3O)_3Si(CH_2)_6Si(OCH_3)_3)$: 4 ml
(3) (2-perfluorooctyl)ethyltrimethoxysilane $(CF_3(CF_2)_7C_2H_4Si(OCH_3)_3)$: 1 ml
(4) Water: 1 ml
(5) Hydrochloric acid (36 vol %): 0.1 ml The mixed solution of these was applied to the substrate by spin coating. The spin coating was carried out at 800 rpm for 20 seconds. Thereafter, the substrate was dried at room temperatures for 1 hour, followed by baking at 200° C. for 30 minutes. Here, the environment during spin coating was set at a temperature at 24° C. and a relative humidity of 34%. A dew point in this environment was 5° C.

Here, for reference, water-repellent coating films were produced using conventionally used methods.

(a) Comparative Example 1 (Conventional Example 1)

400 ml of reactive solution was prepared in which 1 vol % of (2-perfluorooctyl)ethyltrichlorosilane $(CF_3(CF_2)_7C_2H_4SiCl_3)$ was dissolved in perfluorooctane and this solution was poured into a 500 ml-beaker. In addition, three 500 ml-beakers were prepared, and approximately 400 ml of perfluorooctane was poured into each of the beakers.

Next, a substrate was soaked in the beaker containing the reactive solution for 2 hours. Thereafter, the substrate was taken out and was washed in the beaker containing perfluorooctane. The washing was conducted using the three beakers sequentially. As a result, a monomolecular film of fluoroalkyl trichlorosilane was formed on the substrate. These operations were all performed in a glove box filled with a dry nitrogen atmosphere.

(b) Comparative Example 2 (Conventional Example 2)

A coating solution was prepared by mixing chemical substances having the following components:
(1) Ethanol: 100 ml
(2) Tetraethoxysilane $(Si(OC_2H_5)_4)$: 25 ml
(3) (2-perfluorooctyl)ethyltrimethoxysilane $(CF_3(CF_2)_7C_2H_4Si(OCH_3)_3)$: 4 ml
(4) Water: 7 ml
(5) Hydrochloric acid (36 vol %): 0.4 ml This coating solution was applied to the substrate by spin coating under the condition at 3,000 rpm for 20 seconds. Thereafter, the substrate was baked at 300° C. for 30 minutes.

Evaluations of the water-repellent films were conducted in terms of the following three items:

Evaluations of Water Repellency
(1) A static contact angle of the water-repellent film to pure water was measured.
(2) Alkali resistance: A substrate to which a water repellent film has been applied was soaked in a buffer solution of pH=8.0 and was allowed to stand at 80° C. for 100 hours. Then, the substrate was taken out and a static contact angle to pure water was measured. Note here that the buffer solution was prepared by appropriately mixing the following solutions A and B so that the mixed solution had pH=8.0.
Solution A: 0.2 M boric acid, 0.2 M potassium chloride
Solution B: 0.2 M sodium carbonate
(3) Evaluations of wear resistance A cloth (cotton 100%) wetted with water was pressed against a water-repellent film under a load of $2\times10^5$ dyn/cm$^2$ (about 0.2 kg weight/cm$^2$), and the water-repellent film was rubbed with the cloth by moving it back and forth for 1,000 times. A static contact angle of the thus rubbed water-repellent film to pure water was measured.

The results of the evaluations of the water-repellent film prepared in this Example are shown in Table 1. As shown in Table 1, a water-repellent film with high alkali resistance and excellent wear resistance could be realized as compared to the water-repellent films produced by the conventional methods.

EXAMPLE 2

A stainless substrate (SUS304) having a size of 5 cm×5 cm and a thickness of 0.2 mm was used as a substrate. A first coating solution and a second coating solution were prepared by mixing the respective chemical substances having the following components:

First Coating Solution
(1) Mixed solution of ethanol and 2,2,2-trifluoroethanol (mixing at the volume ratio of 8:2): 60 ml
(2) 1,6-bis(trimethoxysilylethyl)perfluorohexane $((CH_3O)_3SiC_2H_4(CF_2)_6C_2H_4Si(OCH_3)_3)$: 6 ml
(3) Water: 1 ml
(4) Hydrochloric acid (36 vol %): 0.1 ml Second Coating Solution
(1) Mixed solution of ethanol and 2,2,2-trifluoroethanol (mixing at the volume ratio of 8:2): 60 ml 1,6-bis(trimethoxysilyl)hexane $((CH_3O)_3Si(CH_2)_6Si(OCH_3)_3)$: 4 ml
(2) (2-perfluorooctyl) ethyltrimethoxysilane $(CF_3(CF_2)_7C_2H_4Si(OCH_3)_3)$: 1 ml
(3) Water: 1 ml
(4) Hydrochloric acid (36 vol %): 0.1 ml Firstly, the first solution was applied to the substrate under the condition at 3,000 rpm for 20 seconds, followed by the application of the second coating solution at 800 rpm for 20 seconds. Thereafter, the substrate was dried at room temperatures for 1 hour, followed by baking at 200° C. for 30 minutes. Here, the environment during spin coating was set at a temperature at 24° C. and a relative humidity of 34%. A dew point in this environment was 5° C.

The results of the evaluations of the water-repellent film prepared in this Example are shown in Table 1. With this example, a water-repellent film with high alkali resistance and excellent wear resistance could be realized as compared to the water-repellent films produced by the conventional methods. Here, in this example, the first layer functioned so as to improve the adhesion between the water-repellent film and the substrate, and therefore the wear resistance could be improved compared to Example 1.

EXAMPLE 3

A water-repellent film was formed in a similar manner to Example 2. However, after the first coating solution was applied to the substrate, followed by baking at 300° C. for 10 minutes, then the second coating solution was applied thereto.

The results of the evaluations of the water-repellent film prepared in this Example are shown in Table 1. With this example, a water-repellent film with high alkali resistance and excellent wear resistance could be realized as compared to the water-repellent films produced by the conventional methods.

EXAMPLE 4

A stainless substrate (SUS304) having a size of 5 cm×5 cm and a thickness of 0.2 mm was used as a substrate.

A first coating solution, a second coating solution and a third coating solution were prepared by mixing the respective chemical substances having the following components:

First Coating Solution
(1) Mixed solution of ethanol and 2,2,2-trifluoroethanol (mixing at the volume ratio of 8:2): 50 ml
(2) Titanium tetra isopropoxide: 10 ml
(3) Tetraethoxysilane: 2 ml
(4) Acetylacetone: 3 ml
(5) Hydrochloric acid (36 vol %): 0.2 ml
(6) Water: 2 ml Second Coating Solution
(1) Mixed solution of ethanol and 2,2,2-trifluoroethanol (mixing at the volume ratio of 8:2): 60 ml
(2) 1,6-bis(trimethoxysilylethyl)perfluorohexane $((CH_3O)_3SiC_2H_4(CF_2)_6C_2H_4Si(OCH_3)_3)$: 6 ml
(3) Water: 1 ml
(4) Hydrochloric acid (36 vol %): 0.1 ml Third Coating Solution
(1) Mixed solution of ethanol and 2,2,2-trifluoroethanol (mixing at the volume ratio of 8:2): 60 ml 1,6-bis(trimethoxysilyl)hexane $((CH_3O)_3Si(CH_2)_6Si(OCH_3)_3)$: 4 ml
(2) (2-perfluorooctyl) ethyltrimethoxysilane $(CF_3(CF_2)_7C_2H_4Si(OCH_3)_3)$: 1 ml
(3) Water: 1 ml
(4) Hydrochloric acid (36 vol %): 0.1 ml Firstly, after the first solution was applied to the substrate by spin coating under the condition at 3,000 rpm for 20 seconds, the substrate was dried at room temperatures for 1 hour, followed by baking at 450° C. for 5 minutes. Next, in the state where the substrate returned to room temperatures, firstly, the second coating solution was applied to the substrate under the condition at 3,000 rpm for 20 seconds, followed by the application of the third coating solution at 800 rpm for 20 seconds. Thereafter, the substrate was dried at room temperatures for 1 hour, followed by baking at 200° C. for 30 minutes. Here, the environment during spin coating was set at a temperature of 24° C. and a relative humidity of 34%. A dew point in this environment was 5° C.

The results of the evaluations of the water-repellent film prepared in this Example are shown in Table 1. With this example, a water-repellent film with high alkali resistance and excellent wear resistance could be realized as compared to the water-repellent films produced by the conventional methods. Here, in this example, the adherence between the first layer and the substrate or the second layer was excellent, and therefore the wear resistance could be improved compared to Examples 1 and 2.

EXAMPLE 5

A water-repellent film was formed in a similar manner to Example 4. However, after the second coating solution was applied to the substrate, followed by baking of the substrate at 300° C. for 10 minutes, then the third coating solution was applied thereto.

The results of the evaluations of the water-repellent film prepared in this Example are shown in Table 1. With this example, a water-repellent film with high alkali resistance and excellent wear resistance could be realized as compared to the water-repellent films produced by the conventional methods.

EXAMPLE 6

A water-repellent film was formed in a similar manner to Example 4. However, instead of 1,6-bis(trimethoxysilyl) hexane, 1,2-bis(triethoxysilyl)ethane $((C_2H_5O)_3Si(CH_2)_2Si(OC_2H_5)_3)$ was used in the third coating solution.

The results of the evaluations of the water-repellent film prepared in this Example are shown in Table 1. With this example, a water-repellent film with high alkali resistance and excellent wear resistance could be realized as compared to the water-repellent films produced by the conventional methods.

EXAMPLE 7

A stainless substrate (SUS304) having a size of 5 cm×5 cm and a thickness of 0.2 mm was used as a substrate. The below mentioned solutions C-1 and C-2 were prepared.

Solution C-1
(1) Mixed solution of ethanol and 2,2,2-trifluoroethanol (mixing at the volume ratio of 8:2): 30 ml
(2) 1,4-bis(trimethoxysilylethyl)benzene $((CH_3O)_3SiC_2H_4C_6H_4C_2H_4Si(OCH_3)_3)$: 2 ml
Hereinafter, this chemical substance will be referred to as a silane coupling agent (A).
(3) (2-perfluorooctyl)ethyltrimethoxysilane $(CF_3(CF_2)_7C_2H_4Si(OCH_3)_3)$: 0.2 ml
Hereinafter, this chemical substance will be referred to as a silane coupling agent (B).

Solution C-2
(1) Mixed solution of ethanol and 2,2,2-trifluoroethanol (mixing at the volume ratio of 8:2): 19.5 ml
(2) Pure water: 30 ml
(3) hydrochloric acid (36 vol %): 0.5 ml
Small amount of the solution C-2 (5 ml) was dropped into the solution C-1 while stirring the solution C-1 with a stirrer. After dropping, stirring was carried out for about one hour so as to prepare a coating solution. In this coating solution, the mol ratio of pure water/silane coupling agent (A) was about 30 and the mol ratio of the silane coupling agent (B)/the silane coupling agent (A) was about 0.1. This mixed solution was applied to the substrate by spin coating. The spin coating was carried out at 3,000 rpm for 20 seconds. Here, the environment during spin coating was set at a temperature at 24° C. and a relative humidity of 34%. A dew point in this environment was 5° C. Thereafter, the substrate was dried at room temperature for one hour, followed by baking at 200° C. for 30 minutes.

The results of the evaluations of the water-repellent film prepared in this Example are shown in Table 1. With this example, a water-repellent film with high alkali resistance and excellent wear resistance could be realized as compared to the water-repellent films produced by the conventional methods.

Here, since 1,4-bis(trimethoxysilylethyl)benzene used in this example includes a benzene ring, this substance is stiffer compared to 1,6-bis(trimethoxysilyl)hexane used in Example 1 (the flexibility permissible for the molecular structure is reduced), and therefore this molecule is packed densely and the film density is increased, thus improving the wear resistance.

From the results of Table 1, a difference in wear resistance between this example and Example 1 cannot be found so much. However, when dry tissue paper (pulp 100%) was used instead of the wetted cloth in the wear-resistance test, a difference in their properties became remarkable. That is to say, when the water-repellent film produced in this example and the film produced in Example 1 were rubbed with dry tissue paper for 500 times and the state of film surface was observed, the film surface of this example had about 10 scratches, whereas, in the case of Example 1, about 30 scratches were observed. It can be assumed that, in the state of absence of water, the pulp of the tissue paper functioned as an abrasive in the wear-resistance test, by which the difference in the degree of scratches was generated due to a difference in the density of the film.

EXAMPLE 8

A water-repellent film was formed in a similar manner to Example 2. However, the coating solution of Example 7 was used as the second coating solution. The results of the evaluations of the water-repellent film prepared in this Example are shown in Table 1. With this example, a water-repellent film with high alkali resistance and excellent wear resistance could be realized as compared to the water-repellent films produced by the conventional methods.

Here, since 1,4-bis(trimethoxysilylethyl)benzene used in this example includes a benzene ring, this substance is stiffer compared to 1,6-bis(trimethoxysilyl)hexane used in Example 2 (the flexibility permissible for the molecular structure is reduced), and therefore this molecule is packed densely and the film density is increased, thus improving the wear resistance.

From the results of Table 1, a difference in wear resistance cannot be found so much. However, when dry tissue paper (pulp 100%) was used instead of the wetted cloth in the wear-resistance test, a difference in their properties became remarkable. That is to say, when the water-repellent film produced in this example and the film produced in Example 2 were rubbed with dry tissue paper for 500 times and the state of film surface was observed, the film surface of this example had about 10 scratches, whereas, in the case of Example 2, about 30 scratches were observed. It can be assumed that, in the state of absence of water, the pulp of the tissue paper functioned as an abrasive in the wear-resistance test, by which the difference in the degree of scratches was generated due to a difference in the density of the film.

EXAMPLE 9

A water-repellent film was formed in a similar manner to Example 4. However, the coating solution of Example 7 was used as the third coating solution. The results of the evaluations of the water-repellent film prepared in this Example are shown in Table 1. With this example, a water-repellent film with high alkali resistance and excellent wear resistance could be realized as compared to the water-repellent films produced by the conventional methods.

Here, since 1,4-bis(trimethoxysilylethyl)benzene used in this example includes a benzene ring, this substance is stiffer compared to 1,6-bis(trimethoxysilyl)hexane used in Example 4 (the flexibility permissible for the molecular structure is reduced), and therefore this molecule is packed densely and the film density is increased, thus improving the wear resistance.

From the results of Table 1, a difference in wear resistance cannot be found so much. However, when dry tissue paper (pulp 100%) was used instead of the wetted cloth in the wear-resistance test, a difference in their properties became remarkable. That is to say, when the water-repellent film produced in this example and the film produced in Example 4 were rubbed with dry tissue paper for 500 times and the state of film surface was observed, the film surface of this example had about 10 scratches, whereas, in the case of Example 4, about 30 scratches were observed. It can be assumed that, in the state of absence of water, the pulp of the tissue paper functioned as an abrasive in the wear-resistance test, by which the difference in the degree of scratches was generated due to a difference in the density of the film.

EXAMPLE 10

A water-repellent film was formed in a similar manner to Example 4. However, the coating solution of Example 7 was used as the third coating solution. In addition, the baking temperature after the application of the third coating solution was set at 300° C. for 15 minutes.

The results of the evaluations of the water-repellent film prepared in this Example are shown in Table 1. With this example, a water-repellent film with high alkali resistance and excellent wear resistance could be realized as compared to the water-repellent films produced by the conventional methods.

Here, since the third-layer water-repellent film used in this example had high heat resistance because it included a benzene ring, this film could be baked at a higher temperature compared to the film produced in Example 4, for example, that included a hydrocarbon chain only. Generally, as the baking temperature increases, the dehydration polymerization reaction of the silane coupling agent increasingly proceeds and a polymer film with a higher density can be formed, so that the hardness of the film and the adhesion thereof to the substrate increases. Therefore, as shown in Table 1 as well, the water-repellent film produced in this example has higher wear resistance compared with the other water-repellent films that were baked at 200° C.

Furthermore, similarly, a difference in wear-resistance from the film produced in Example 9 was examined. When dry tissue paper (pulp 100%) was used instead of the wetted cloth in the wear-resistance test, a difference in their properties became remarkable. That is to say, when the water-repellent film produced in this example and the film produced in Example 9 were rubbed with dry tissue paper for 500 times and the state of film surface was observed, the film produced in this example had no scratches on the surface thereof, whereas, in the case of Example 9, about 10 scratches were generated. This indicates that, even when the same coating solution is applied, the wear resistance can be improved in the film of this example that was baked at a high temperature than in the film of Example 9 baked at a lower temperature.

TABLE 1

Evaluation Results of Water-repellent Films Produced in Examples and Comparative Examples

| Types of water repellent films | Static contact angle to water (deg) | | |
|---|---|---|---|
| | Initial value | Value after soaked in solution of pH = 8 at 70° C. for 100 hours | Value after wear-resistance test with wetted cloth |
| Example 1 | 101 | 100 | 92 |
| Example 2 | 101 | 100 | 95 |
| Example 3 | 101 | 100 | 98 |
| Example 4 | 101 | 101 | 100 |
| Example 5 | 101 | 101 | 100 |
| Example 6 | 101 | 100 | 100 |
| Example 7 | 101 | 100 | 100 |
| Example 8 | 101 | 100 | 100 |
| Example 9 | 101 | 100 | 100 |
| Example 10 | 101 | 100 | 101 |
| Comp. Example 1 | 110 | 15 | 109 |
| Comp. Example 2 | 104 | 5 (film was dissolved) | 103 |

EXAMPLE 11

A stainless substrate (SUS304) having a size of 3 cm×3 cm and a thickness of 100 μm was used as a substrate. A coating solution was prepared by mixing chemical substances having the following components:
(1) Mixed solution of ethanol and 2,2,2-trifluoroethanol (mixing at the volume ratio of 8:2): 60 ml
(2) 1,6-bis(trimethoxysilyl)hexane (($CH_3O)_3Si(CH_2)_6Si(OCH_3)_3$): 4 ml
(3) (2-perfluorooctyl)ethyltrimethoxysilane ($CF_3(CF_2)_7C_2H_4Si(OCH_3)_3$): 1 ml
(4) Water: 1 ml
(5) Hydrochloric acid (36 vol %): 0.1 ml The mixed solution of these was applied to the substrate by spin coating. The spin coating was carried out at 800 rpm for 20 seconds.

Thereafter, the substrate was dried at room temperatures for 1 hour, followed by baking at 200° C. for 30 minutes. Here, the environment during spin coating was set at a temperature at 24° C. and a relative humidity of 34%. A dew point in this environment was 5° C. Thereafter, 400 through holes for nozzles having a diameter of 30 μm were bored in the substrate to form an ink jet nozzle (hereinafter described as a nozzle plate), and this was assembled as a print head, which was incorporated into an ink jet printer.

Evaluations of the nozzle plate were conducted in terms of the following four items: here, the ink used in the evaluations was black ink with pH=9.0 and a surface tension of 35 dyn/cm. The ink was prepared by mixing black dye, glycerin, a penetrant, a pH adjustor and water at a predetermined ratio. The evaluations (A) to (C) were conducted using a substrate without nozzle holes.

A. Evaluation of Water Repellency

A static contact angle and a receding contact angle of a water-repellent film to the ink were measured. Furthermore, about 30 μl of ink was dropped onto the nozzle plate, and was wiped with a rubber blade made of polybutadiene, having a size of 5 mm×30 mm and a thickness of 1 mm so as to examine whether the ink remained or not. More specifically, the rubber blade was arranged perpendicular to the nozzle plate face so that a side with a length of 5 mm contacted with the nozzle plate, and was moved in one direction to remove the ink. Visual inspection was made as to whether the ink was removed or not.

B. Ink Resistance Property

After the nozzle plate was soaked in the ink, the plate was allowed to stand at 70° C. for 500 hours. Then, after the plate was taken out and was washed with pure water, a static contact angle and a receding contact angle to the ink were measured. In addition, the ink-removable property also was evaluated in the same manner as in (A).

C. Wear-Resistance Property

A rubber blade made of polybutadiene, having a size of 5 mm×30 mm and a thickness of 1 mm, was arranged perpendicular to the nozzle plate face so that a side with a length of 5 mm contacted with the nozzle plate, and the rubber blade was pressed by about 2 mm toward the nozzle plate. Then, in this state, the plate was rubbed with the side with a length of 5 mm for 50,000 times. After that, a static contact angle and a receding contact angle of the nozzle plate to the ink were measured.

D. Evaluation of Print Property

After the nozzle plate was soaked in the ink and was allowed to stand at 70° C. for 500 hours, this nozzle plate was assembled as a print head, which was incorporated into a printer. Then, printing was conducted with this printer. A print quality was compared with that printed with a nozzle plate that was not thus treated. The results of the evaluations of the water-repellent film produced in this example are shown in Table 2.

(1) Evaluation of the result (A): A static contact angle and a receding contact angle of the ink to a fluororesin that was polished to be the closest possible to a mirror surface were both 70 deg. Therefore, it can be considered that the water-repellent film having a value closer to this value has an ink-repellent property equivalent to the fluororesin. Furthermore, as a value of the static contact angle becomes closer to a value of the receding contact angle, the remaining ink is more easily removed when the nozzle surface is wiped with a rubber blade. From these results, the ink-repellent property equivalent to the fluororesin could not be obtained, but the ink could be repelled sufficiently and the remaining ink could be removed completely by wiping it with the rubber blade. Therefore, these results indicate that a water-repellent film with a good ink-repellency could be realized.

(2) Evaluation of the result (B): Although the contact angle to the ink was decreased after the test, it was confirmed that, even in the case of this value of static contact angle, the ink could be repelled sufficiently and the remaining ink could be removed completely by wiping it with the rubber blade. Therefore, the results indicate that a water-repellent film having durability against ink could be realized.

(3) Evaluation of the result (C): The value of the contact angle hardly changed. Therefore, this result indicates that a water-repellent film having wear-resistance could be realized.

(4) Evaluation of the result (D): The discharge property was favorable like the nozzle plate before the test. From this result, it is indicated that a nozzle plate having durability against ink could be realized.

From these results, a nozzle plate that was applicable to an ink jet printer could be realized. Here, in this example, the mixed solution of ethanol and 2,2,2-trifluoroethanol was used as a solvent of the coating solution. This solution has good wettability with the substrate, so that this solution allows easy formation of a uniform water-repellent film. Furthermore, in the silane coupling agent having a hydrocarbon chain, the number of carbons that constitute the carbon chain was set at 6. This value is sufficient for preventing an alkaline component from intruding into the film and is capable of forming a high-density film with excellent wear resistance.

EXAMPLE 12

A stainless substrate (SUS304) having a size of 3 cm×3 cm and a thickness of 100 μm was used as a substrate. A first coating solution and a second coating solution were prepared by mixing the respective chemical substances having the following components:

1. First Coating Solution
(1) Mixed solution of ethanol and 2,2,2-trifluoroethanol (mixing at the volume ratio of 8:2): 60 ml
(2) 1,6-bis(trimethoxysilylethyl)perfluorohexane (($CH_3O)_3SiC_2H_4(CF_2)_6C_2H_4Si(OCH_3)_3$): 6 ml
(3) Water: 1 ml
(4) Hydrochloric acid (36 vol %): 0.1 ml 2. Second Coating Solution
(1) Mixed solution of ethanol and 2,2,2-trifluoroethanol (mixing at the volume ratio of 8:2): 60 ml
(2) 1,6-bis(trimethoxysilyl)hexane (($CH_3O)_3Si(CH_2)_6Si(OCH_3)_3$): 4 ml
(3) (2-perfluorooctyl) ethyltrimethoxysilane ($CF_3(CF_2)_7C_2H_4Si(OCH_3)_3$): 1 ml
(4) Water: 1 ml
(5) Hydrochloric acid (36 vol %): 0.1 ml The mixed solution of these was applied to the substrate by spin coating. Firstly, the first coating solution was applied to the substrate under the condition at 3,000 rpm for 20 seconds, followed by the application of the second coating solution at 800 rpm for 20 seconds. Thereafter, the substrate was dried at room temperatures for 1 hour, followed by baking at 200° C. for 30 minutes. Here, the environment during spin coating was set at a temperature at 24° C. and a relative humidity of 34%. A dew point in this environment was 5° C. The results of evaluations of the water-repellent film produced in this example are shown in Table 2.

1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

Here, in this example, 1,8-bis(trimethoxysilylethyl)perfluorohexane was used as the silane coupling agent that constitutes the first-layer film. The length of a fluorocarbon chain in this coupling agent is sufficient for preventing an alkaline component from intruding into the film and is capable of forming a high-density film with excellent wear resistance.

EXAMPLE 13

A water-repellent film was formed in a similar manner to Example 12. However, after the first coating solution was applied to the substrate, followed by baking of the substrate at 300° C. for 10 minutes, then the second coating solution was applied thereto. The results of evaluations of the water-repellent film produced in this example are shown in Table 2.

1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

EXAMPLE 14

A stainless substrate (SUS304) having a size of 3 cm×3 cm and a thickness of 100 μm was used as a substrate. A first coating solution, a second coating solution and a third coating solution were prepared by mixing the respective chemical substances having the following components:

1. First Coating Solution
(1) Mixed solution of ethanol and 2,2,2-trifluoroethanol (mixing at the volume ratio of 8:2): 50 ml
(2) Titanium tetra isopropoxide: 10 ml
(3) Tetraethoxysilane: 2 ml
(4) Acetylacetone: 3 ml
(5) Hydrochloric acid (36 vol %): 0.2 ml
(6) Water: 2 ml 2. Second Coating Solution
(1) Mixed solution of ethanol and 2,2,2-trifluoroethanol (mixing at the volume ratio of 8:2): 60 ml
(2) 1,8-bis(trimethoxysilylethyl)perfluorohexane (($CH_3O)_3SiC_2H_4(CF_2)_6C_2H_4Si(OCH_3)_3$): 6 ml
(3) Water: 1 ml
(4) Hydrochloric acid (36 vol %): 0.1 ml 3. Third Coating Solution
(1) Mixed solution of ethanol and 2,2,2-trifluoroethanol (mixing at the volume ratio of 8:2): 60 ml
(2) 1,6-bis(trimethoxysilyl)hexane (($CH_3O)_3Si(CH_2)_6Si(OCH_3)_3$): 4 ml
(3) (2-perfluorooctyl) ethyltrimethoxysilane ($CF_3(CF_2)_7C_2H_4Si(OCH_3)_3$): 1 ml
(4) Water: 1 ml
(5) Hydrochloric acid (36 vol %): 0.1 ml Firstly, after the first solution was applied to the substrate by spin coating at 3,000 rpm for 20 seconds, the substrate was dried at room temperatures for 1 hour, followed by baking at 450° C. for 5 minutes. Next, in the state where the substrate returned to room temperatures, the second coating solution was applied to the substrate under the condition at 3,000 rpm for 20 seconds, followed by the application of the third coating solution at 800 rpm for 20 seconds. Thereafter, the substrate was dried at room temperatures for 1 hour, followed by baking at 200° C. for 30 minutes. Here, the environment during spin coating was set at a temperature of 24° C. and a relative humidity of 34%. A dew point in this environment was 5° C.

The results of evaluations of the water-repellent film produced in this example are shown in Table 2.

1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

Here, in this example, the volume ratio of the silicon-alkoxide and the titanalkoxide as components of the first-layer film was set at 2:10. This value is set so as to prevent the film from being destroyed by the alkaline component and so as to realize a sufficient density of hydroxyl groups on the surface thereof that brings the second-layer film into intimate contact thereto.

EXAMPLE 15

A water-repellent film was formed in a similar manner to Example 14. However, after the second coating solution was applied to the substrate, followed by baking of the substrate at 300° C. for 10 minutes, then the third coating solution was applied thereto. The results of evaluations of the water-repellent film produced in this example are shown in Table 2.
1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

EXAMPLE 16

A water-repellent film was formed in the similar manner as in Example 14. However, instead of 1,6-bis(trimethoxysilyl)hexane as in the third coating solution, 1,2-bis(triethoxysilyl)ethane (($C_2H_5O$)$_3$Si($CH_2$)$_2$Si(O$C_2H_5$)$_3$) was used. The results of evaluations of the water-repellent film produced in this example are shown in Table 2.
1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

EXAMPLE 17

A stainless substrate (SUS304) having a size of 3 cm×3 cm and a thickness of 1001 m was used as a substrate. The below mentioned solutions C-1 and C-2 were prepared.

Solution C-1
(1) Mixed solution of ethanol and 2,2,2-trifluoroethanol (mixing at the volume ratio of 8:2): 30 ml
(2) 1,4-bis(trimethoxysilylethyl)benzene (($CH_3O$)$_3$Si$C_2H_4C_6H_4C_2H_4$Si(O$CH_3$)$_3$): 2 ml
Hereinafter, this chemical substance will be referred to as a silane coupling agent (A).
(3) (2-perfluorooctyl)ethyltrimethoxysilane ($CF_3(CF_2)_7$$C_2H_4$Si(O$CH_3$)$_3$): 0.2 ml
Hereinafter, this chemical substance will be referred to as a silane coupling agent (B).

Solution C-2
(1) Mixed solution of ethanol and 2,2,2-trifluoroethanol (mixing at the volume ratio of 8:2): 19.5 ml
(2) Pure water: 30 ml
(3) Hydrochloric acid (36 vol %): 0.5 ml A small amount of the solution C-2 (5 ml) was dropped into the solution C-1 while stirring the solution C-1 with a stirrer. After dropping, stirring was carried out for about one hour so as to prepare a coating solution. In this coating solution, the mol ratio of pure water/the silane coupling agent (A) was about 30 and the mol ratio of the silane coupling agent (B)/the silane coupling agent (A) was about 0.1. Similarly to Example 11, this mixed solution was applied to the substrate by spin coating. The spin coating was carried out at 3,000 rpm for 20 seconds. Here, the environment during spin coating was set at a temperature of 24° C. and a relative humidity of 34%. A dew point in this environment was 5° C. Thereafter, the substrate was dried at room temperature for one hour, followed by baking at 200° C. for 30 minutes.

The results of evaluations of the water-repellent film produced in this example are shown in Table 2.
1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

Here, since 1,4-bis(trimethoxysilylethyl)benzene used in this example includes a benzene ring, this substance is stiffer compared to 1,6-bis(trimethoxysilyl)hexane used in Example 11 (the flexibility permissible for the molecular structure is reduced), and therefore this molecule is packed densely and the film density is increased, thus improving the wear resistance.

From the results of Table 2, a difference in wear resistance is not so great. However, when the wear resistance test was performed in the presence of pigment ink, a difference in their properties became remarkable. That is to say, when the water-repellent film produced in this example and the film produced in Example 11 were rubbed with a cotton swab impregnated with the pigment ink for 100 times and the state of film surface was observed, the film surface of this example had about 10 scratches, whereas, in the case of Example 11, about 30 scratches were observed. It can be assumed that, since the pigment ink contained a hard inorganic substance, this substance functioned as an abrasive in the wear-resistance test, by which the difference in the degree of scratches was generated due to a difference in the density of the film.

EXAMPLE 18

A water-repellent film was formed in a similar manner to Example 12. However, the coating solution of Example 17 was used as the second coating solution. The results of evaluations of the water-repellent film produced in this example are shown in Table 2.
1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

Here, since 1,4-bis(trimethoxysilylethyl)benzene used in this example includes a benzene ring, this substance is stiffer compared to 1,6-bis(trimethoxysilyl)hexane used in Example 12 (the flexibility permissible for the molecular structure is reduced), and therefore this molecule is packed densely and the film density is increased, thus improving the wear resistance.

From the results of Table 2, a difference in wear resistance cannot be found so much. However, when the wear resistance test was performed in the presence of pigment ink, a difference in their properties became remarkable. That is to say, when the water-repellent film produced in this example and the film produced in Example 12 were rubbed with a cotton swab impregnated with the pigment ink for 100 times and the state of film surface was observed, the film surface of this example had about 10 scratches, whereas, in the case of Example 11, about 30 scratches were observed. It can be assumed that, since the pigment ink contained a hard inorganic substance, this substance functioned as an abrasive in the wear-resistance test, by which the difference in the degree of scratches was generated due to a difference in the density of the film.

EXAMPLE 19

A water-repellent film was formed in the same manner as in Example 14. However, the coating solution of Example 17 was used as the third coating solution. The results of evaluations of the water-repellent film produced in this example are shown in Table 2.
1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

Here, since 1,4-bis(trimethoxysilylethyl)benzene used in this example includes a benzene ring, this substance is stiffer compared to 1,6-bis(trimethoxysilyl)hexane used in Example 14 (the flexibility permissible for the molecular structure is reduced), and therefore this molecule is packed densely and the film density is increased, thus improving the wear resistance.

From the results of Table 2, a difference in wear resistance is not so great. However, when the wear resistance test was performed in the presence of pigment ink, a difference in their properties became remarkable. That is to say, when the water-repellent film produced in this example and the film produced in Example 14 were rubbed with a cotton swab impregnated with ink for 100 times and the state of film surface was observed, the film surface of this example had about 10 scratches, whereas, in the case of Example 11, about 30 scratches were observed. It can be assumed that, since the pigment ink contained a hard inorganic substance, this substance functioned as an abrasive in the wear-resistance test, by which the difference in the degree of scratches was generated due to a difference in the density of the film.

EXAMPLE 20

A water-repellent film was formed in the similar manner as in Example 14. However, the coating solution of Example 17 was used as the third coating solution. In addition, the baking temperature after the application of the third coating solution was set at 300° C. for 15 minutes. The results of evaluations of the water-repellent film produced in this example are shown in Table 2.
1. Evaluation of the result (A): It is indicated that a water-repellent film with a good ink-repellency could be realized.
2. Evaluation of the result (B): It is indicated that a water-repellent film with durability against ink could be realized.
3. Evaluation of the result (C): It is indicated that a water-repellent film with wear resistance could be realized.
4. Evaluation of the result (D): It is indicated that a nozzle plate with durability against ink could be realized.

From these results, a nozzle plate that was applicable to an ink jet printer could be realized.

Here, since the third-layer water-repellent film used in this example had a high heat resistance because it included a benzene ring, this film could be baked at a higher temperature compared to the film produced in Example 14, for example, that included a hydrocarbon chain only. Generally, as the baking temperature increases, the dehydration polymerization reaction of the silane coupling agent increasingly proceeds and a polymer film with a higher density can be formed, so that the hardness of the film and the adhesion thereof to the substrate increases. Therefore, the water-repellent film produced in this example has higher wear resistance compared with the other water-repellent films that were baked at 200° C.

From the results of Table 2, a difference in wear resistance is not so great. However, when the wear resistance test was performed in the presence of pigment ink, a difference in their properties became remarkable. That is to say, when the water-repellent film produced in this example and the film produced in Example 14 were rubbed with a cotton swab impregnated with the pigment ink for 100 times and the state of film surface was observed, the film surface of this example had about 10 scratches, whereas, in the case of Example 14, about 30 scratches were observed. It can be assumed that, since the pigment ink contained a hard inorganic substance, this substance functioned as an abrasive in the wear-resistance test, by which the difference in the degree of scratches was generated due to a difference in the density of the film.

Furthermore, similarly, a difference in wear-resistance from the film produced in Example 19 was examined. To this end, the film surface was rubbed with a cotton swab wetted with pigment ink for 1,000 times to examine the difference for both films. As a result, the film produced in this example had about 20 scratches on the surface thereof, whereas the film produced in Example 19 had about 50 scratches on the surface thereof. This indicates that, even when the same coating solution is applied, the wear resistance can be improved in the film of this example that was baked at a high temperature versus the film of Example 19 baked at a lower temperature.

EXAMPLE 21

A stainless substrate (SUS304) having a size of 3 cm×3 cm and a thickness of 100 μm was used as a substrate. A first coating solution and a second coating solution were prepared by mixing the respective chemical substances having the following components:

1. First Coating Solution
(1) Mixed solution of ethanol and 2,2,2-trifluoroethanol (mixing at the volume ratio of 8:2): 50 ml
Titanium tetra isopropoxide: 10 ml
(2) Tetraethoxysilane: 2 ml
(3) Acetylacetone: 3 ml
(4) Hydrochloric acid (36 vol %): 0.2 ml
(5) Water: 2 ml 2. Second Coating Solution
(1) Mixed solution of ethanol and 2,2,2-trifluoroethanol (mixing at the volume ratio of 8:2): 60 ml
(2) (2-perfluorooctyl) ethyltrimethoxysilane ($CF_3(CF_2)_7C_2H_4Si(OCH_3)_3$): 6 ml
(3) Water: 1 ml
(4) Hydrochloric acid (36 vol %): 0.1 ml Firstly, after the first solution was applied to the substrate by spin coating under the condition at 3,000 rpm for 20 seconds, the substrate was dried at room temperatures for 1 hour, followed by baking at 450° C. for 5 minutes. Next, in the state where the substrate returned to room temperatures, the second coating solution was applied to the substrate under the condition at 800 rpm for 20 seconds, and then the substrate was dried at room temperatures for 1 hour, followed by baking at 300° C. for 30 minutes. The results of evaluations of the water-repellent film produced in this example are shown in Table 2.

1. Evaluation of the result (A): It can be estimated that the reason for the static contact angle being larger than the value with respect to a fluororesin is that the unevenness of the surface of the second-layer film is large. Generally, as the unevenness of the surface increases, there is a tendency that a receding contact angle is reduced. This result also can be affected by the tendency. However, in spite of the presence of such unevenness, ink could be wiped away sufficiently. Therefore, the result indicates that a water-repellent film with a good ink-repellency could be realized.
2. Evaluation of the result (B): It is indicated that a water-repellent film with durability against ink could be realized.
3. Evaluation of the result (C): After the test, the static contact angle and the receding contact angle were reduced. In addition, the values of the static contact angle and the receding contact angle became smaller. This indicates that a part of the surface of the second-layer water-repellent film was ground by the wear-resistance test so as to make the unevenness of the surface flat. When an evaluation was conducted in this state as to whether the ink can be wiped away or not, the ink could be removed completely. Therefore, it is indicated that a water-repellent film with wear resistance could be realized.
4. Evaluation of the result (D): It is indicated that a nozzle plate with durability against ink could be realized.

TABLE 2

Evaluation Results of Water-repellent Films Produced in Examples

| Types of water repellent films | Contact angle to ink (static contact angle–receding contact angle: unit deg) | | | Print property after soaked in ink at 70° C. for 500 hrs |
|---|---|---|---|---|
| | Initial value | Value after soaked in ink at 70° C. for 500 hrs | After rubbing for 100,000 times | |
| Example 11 | 61–59 | 50–48 | 61–59 | good |
| Example 12 | 62–60 | 50–48 | 62–60 | good |
| Example 13 | 62–61 | 50–48 | 62–61 | good |
| Example 14 | 62–61 | 50–48 | 62–61 | good |
| Example 15 | 62–61 | 50–48 | 62–61 | good |
| Example 16 | 62–61 | 45–40 | 62–61 | good |
| Example 17 | 65–62 | 55–52 | 65–62 | good |
| Example 18 | 66–62 | 55–52 | 66–62 | good |
| Example 19 | 66–62 | 55–52 | 66–62 | good |
| Example 20 | 66–62 | 55–52 | 66–62 | good |
| Example 21 | 90–70 | 70–40 | 70–60 | good |

From these results, water-repellent films having alkali resistance could be realized. In addition, using these films, nozzle plates that were applicable to an ink jet printer could be realized. Here, in the embodiments and the examples of the present invention, an alkoxysilane compound only is described as the silane coupling agent. However, the silane coupling agent is not limited to this, and if the water content is controlled strictly, similar water-repellent films can be formed using a chlorosilane compound, a silazane compound and the like that have high reactivity. Furthermore, although spin coating is used for the application method in all of the examples, the application method is not limited to this, and needless to say, a dip method, a spray method and the like can be used. Furthermore, in the examples of the present invention, the water-repellent films utilize some sorts of silane coupling agents, ethanol and 2,2,2-trifluoroethanol as the solvents, and hydrochloric acid as the acidic catalyst, which are not limiting ones. For example, as the solvent, propanol, butanol and a mixture thereof are available, and as the acidic catalyst, nitric acid, acetic acid, formic acid, etc. are available. Furthermore, the compositions of the coating solution are not limited to those described in the embodiments, and two or more types of silane coupling agents can be combined. In addition, for example, an inhibitor, a thickener such as polyethylene glycol and a surface-active agent for controlling the surface tension can be used. Furthermore, the amount of the silane coupling agent can be varied depending on an intended use, for example, in order to improve the water repellency, the amount of silane coupling agent having a fluoroalkyl chain may be increased. In addition, in the examples, the nozzle holes are all bored by electrical discharge machining. However, the method is not limited to this, and laser machining, punching machining, etching machining and the like can be used.

INDUSTRIAL APPLICABILITY

As stated above, according to the present invention, a water-repellent film having high alkali resistance can be realized using a silane coupling agent.

The water-repellent film of the present invention includes a fluoroalkyl chain, so as to have a low surface energy. Therefore, the film can repel various kinds of liquid such as oil, in addition to water, and a solid substance that adheres to this film can be removed easily. Therefore, the water-repellent film is useful as an antifouling film applicable to household equipment, for example, cooking equipment or a bedpan, to which dirt tends to attach. In particular, the water-repellent film of the present invention is useful as an antifouling film of a part exposed to a high alkali detergent. Furthermore, the water-repellent film of the present invention is applicable to various fields, for example, application to a part that is always exposed to an alkaline solution.

The invention claimed is:

1. A water-repellent film that is formed on a solid substrate, comprising:
    a molecule (A) —OSi($R^1R^2$)($CH_2$)$_n$Si($R^1R^2$)O— comprising at least one or more of siloxane bonding (—Si—O—) at both ends and a hydrocarbon chain in a middle part, (where $R^1$ and $R^2$ are a methyl group, an ethyl group, a methoxy group(—$OCH_3$), an ethoxy group (—$OC_2H_5$), a hydroxyl group (—OH), or oxygen constituting siloxane bonding, and n is a natural number from 1 to 10) or a molecule (A) and comprising at least one or more of siloxane bonding (—Si—O—) at both ends and a benzene ring in a middle part; and
    a molecule (B) comprising a fluorocarbon chain at one end and at least one or more of siloxane bonding (—Si—O—) at another end,
    wherein a polymer film is formed at least with the molecule (A) and the molecule (B),
    wherein a ratio of the molecule (B) to the molecule (A) is in the ranue from 0.001 to 0.2 (the amount of molecule (B)/the amount of molecule (A)) as represented by a mol ratio.

2. The water-repellent film according to claim 1, wherein a density of the molecule (B) in the vicinity of the outermost surface of the water-repellent film is higher than a density of the molecule (B) inside the water-repellent film.

3. The water-repellent film according to claim 1, wherein the molecule (A) comprises a straight-chain hydrocarbon chain.

4. The water-repellent film according to claim 3, wherein the number of carbons that constitute the straight-chain hydrocarbon chain ranges from 1 to 10, inclusive.

5. The water-repellent film according to claim 1, wherein the molecule (A) comprises a benzene ring.

6. A water-repellent film that is formed on a solid substrate, comprising:
    a molecule (A) —OSi($R^1R^2$)($CH_2$)$_n$Si($R^1R^2$)O— comprising at least one or more of siloxane bonding (—Si—O—) at both ends and a hydrocarbon chain in a middle part, (where $R^1$ and $R^2$ are a methyl group, an ethyl group, a methoxy group(—$OCH_3$), an ethoxy group (—$OC_2H_5$), a hydroxyl group (—OH), or oxygen constituting siloxane bonding, and n is a natural number from 1 to 10) or a molecule (A) and comprising at least one or more of siloxane bonding (—Si—O—) at both ends and a benzene ring in a middle part; and
    a molecule (B) comprising a fluorocarbon chain at one end and at least one or more of siloxane bonding (—Si—O—) at another end,
    wherein a polymer film is formed at least with the molecule (A) and the molecule (B),
    wherein, between the solid substrate and the water-repellent film, a first lower polymer film further is formed, the first lower polymer film being configured with a molecule comprising at least one or more of siloxane bonding (—Si—O—) at both ends and a fluorocarbon chain in a middle part.

7. The water-repellent film according to claim 6, wherein, between the solid substrate and the first lower polymer film, a second lower oxide film is formed, the second lower oxide film being made of a mixture of a silicon oxide and a titanium oxide.

* * * * *

UNITED STATES PATENT AND TRADEMARK OFFICE
CERTIFICATE OF CORRECTION

| | | |
|---|---|---|
| PATENT NO. | : 7,141,305 B2 | Page 1 of 1 |
| APPLICATION NO. | : 10/469144 | |
| DATED | : November 28, 2006 | |
| INVENTOR(S) | : Nakagawa et al. | |

It is certified that error appears in the above-identified patent and that said Letters Patent is hereby corrected as shown below:

Column 35, line 33(claim 1): "(A) and comprising" should read --(A) comprising--.
Column 35, line 42(claim 1): "ranue" should read --range--.
Column 36, line 23(claim 6): "(A) and comprising" should read --(A) comprising--.

Signed and Sealed this

Twenty-sixth Day of June, 2007

JON W. DUDAS
*Director of the United States Patent and Trademark Office*